(12) United States Patent
Will

(10) Patent No.: US 11,567,185 B2
(45) Date of Patent: Jan. 31, 2023

(54) RADAR-BASED TARGET TRACKING USING MOTION DETECTION

(71) Applicant: Infineon Technologies AG, Neubiberg (DE)

(72) Inventor: Christoph Will, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 258 days.

(21) Appl. No.: 16/866,854

(22) Filed: May 5, 2020

(65) Prior Publication Data

US 2021/0349203 A1    Nov. 11, 2021

(51) Int. Cl.
| | |
|---|---|
| *G01S 13/72* | (2006.01) |
| *G01S 7/35* | (2006.01) |
| *G01S 13/58* | (2006.01) |
| *G01S 13/64* | (2006.01) |

(52) U.S. Cl.
CPC ............ *G01S 13/726* (2013.01); *G01S 7/352* (2013.01); *G01S 13/584* (2013.01); *G01S 13/64* (2013.01); *G01S 7/356* (2021.05); *G01S 7/358* (2021.05)

(58) Field of Classification Search
CPC ...... G01S 13/726; G01S 7/352; G01S 13/584; G01S 13/64; G01S 7/356; G01S 7/358; G01S 7/417; G01S 7/415; G01S 13/723; G01S 13/08

See application file for complete search history.

(56) References Cited

U.S. PATENT DOCUMENTS

| | | | |
|---|---|---|---|
| 4,241,347 A | 12/1980 | Albanese et al. | |
| 6,011,507 A | * | 1/2000 | Curran .................. G01S 13/931 342/70 |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

(Continued)

*Primary Examiner* — Donald H B Braswell

(74) *Attorney, Agent, or Firm* — Slater Matsil, LLP

(57) ABSTRACT

In an embodiment, a method includes: receiving reflected radar signals with a millimeter-wave radar; performing a range discrete Fourier Transform (DFT) based on the reflected radar signals to generate in-phase (I) and quadrature (Q) signals for each range bin of a plurality of range bins; for each range bin of the plurality of range bins, determining a respective strength value based on changes of respective I and Q signals over time; performing a peak search across the plurality of range bins based on the respective strength values of each of the plurality of range bins to identify a peak range bin; and associating a target to the identified peak range bin.

22 Claims, 34 Drawing Sheets

(56) References Cited

U.S. PATENT DOCUMENTS

| | | |
|---|---|---|
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 2002/0180633 A1* | 12/2002 | Nakanishi ............ G01S 13/931 342/111 |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0038953 A1* | 2/2018 | Choi ...................... G01S 7/003 |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2019/0011549 A1* | 1/2019 | Mercuri .............. A61B 5/0507 |
| 2020/0116850 A1 | 4/2020 | Santra et al. |
| 2020/0145042 A1* | 5/2020 | Kulkarni ............ H04L 25/0212 |
| 2020/0158851 A1* | 5/2020 | Suematsu ............... G01S 7/352 |
| 2020/0218913 A1* | 7/2020 | Unnikrishnan ......... B60R 11/04 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Vinci, Gabor et al., "Six-Port Radar Sensor for Remote Respiration Rate and Heartbeat Vital-Sign Monitoring", IEEE Transactions on

(56) References Cited

OTHER PUBLICATIONS

Microwave Theory and Techniques, vol. 61, No. 5, May 2013, pp. 2093-2100.
Wang, Fu-Kang et al., "Wrist Pulse Rate Monitor Using Self-Injection-Locked Radar Technology", Biosensors, MDPI, Oct. 26, 2016, 12 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.
Will, Christoph et al., "Advanced Template Matching Algorithm for Instantaneous Heartbeat Detection using Continuous Wave Radar Systems", ResearchGate, May 2017, 5 pages.
Will, Christoph et al., "Human Target Detection, Tracking, and Classification Using 24-GHz FMCW Radar", IEEE Sensors Journal, vol. 19, No. 17, Sep. 1, 2019, pp. 7283-7299.
Will, Christoph et al., "Local Pulse Wave Detection using Continuous Wave Radar Systems", IEEE Journal of Electromagnetics, RF and Microwaves in Medicine and Biology, Oct. 25, 2017, 9 pages.
Will, Christoph et al., "Radar-Based Heart Sound Detection", Scientific Reports, www.nature.com/scientificreports, Jul. 26, 2018, 15 pages.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.
Ahmad, A. et al., "Vital Signs Monitoring of Multiple People Using a FMCW Millimeter-Wave Sensor," IEEE Radar Conference, Apr. 23, 2018, 6 pages.
Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.
"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.
Gigie, Andrew et al., "Novel Approach for Vibration Detection Using Indented Radar", Progess in Electromagnetic Research C, vol. 87, pp. 147-162, Oct. 4, 2018.
Gouveia, Carolina et al., "A Review on Methods for Random Motion Detection and Compensation in Bio-Radar Systems", Sensors, MDPI, Jan. 31, 2019, 17 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Gu, Changzhan et al., "Deep Neural Network based Body Movement Cancellation for Doppler Radar Vital Sign Detection", IEEE MTT-S International Wireless Symposium (IWS) May 19-22, 2019, 3 pages.
Gu, Changzhu "Short-Range Noncontact Sensors for Healthcare and Other Emerginng Applications: A Review", Sensors, MDPI, Jul. 26, 2016, 24 pages.
Gu, Changzhan et al., "From Tumor Targeting to Speed Monitoring", IEEE Microwave Magazine, ResearchGate, Jun. 2014, 11 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.
Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWR1xxx Power Management Optimizations—Low Cost LC Filter Solution," Application Report SWRA577, Texas Instruments, Oct. 2017, 19 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.
Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.
Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.
Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.
Li, Changzhi "Vital-sign monitoring on the go", Sensors news and views, www.nature.com/naturelectronics, Nature Electronics, vol. 2, Jun. 2019, 2 pages.
Lim, Soo-Chul et al., "Expansion of Smartwatch Touch Interface from Touchscreen to Around Device Interface Using Infrared Line

(56) References Cited

OTHER PUBLICATIONS

Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 42 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

\* cited by examiner

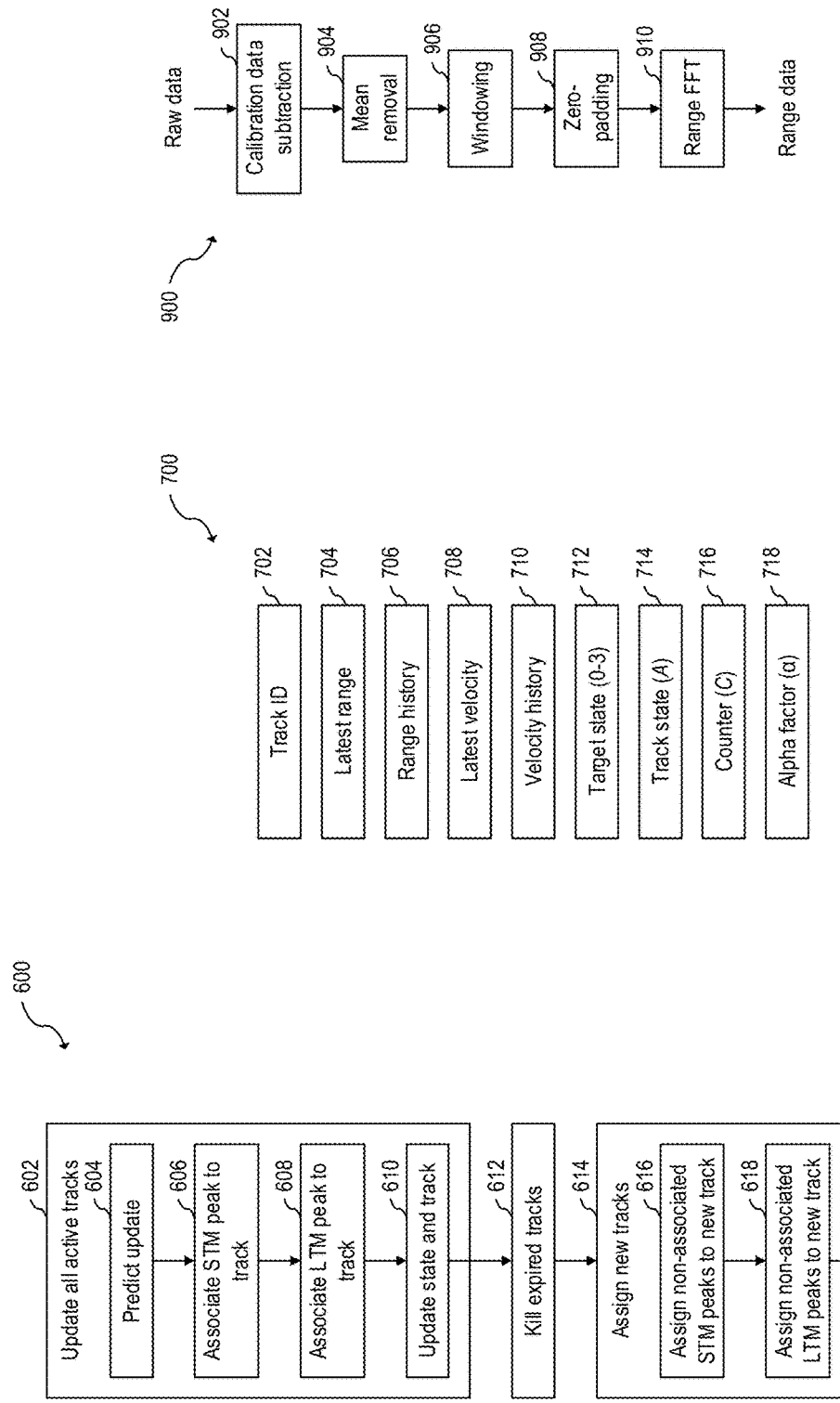

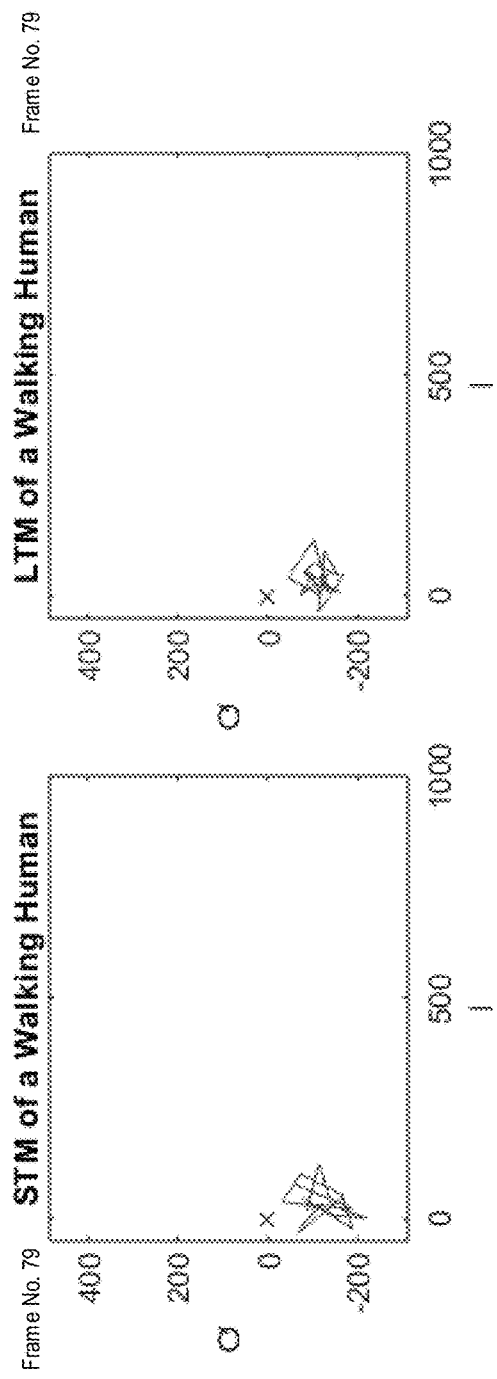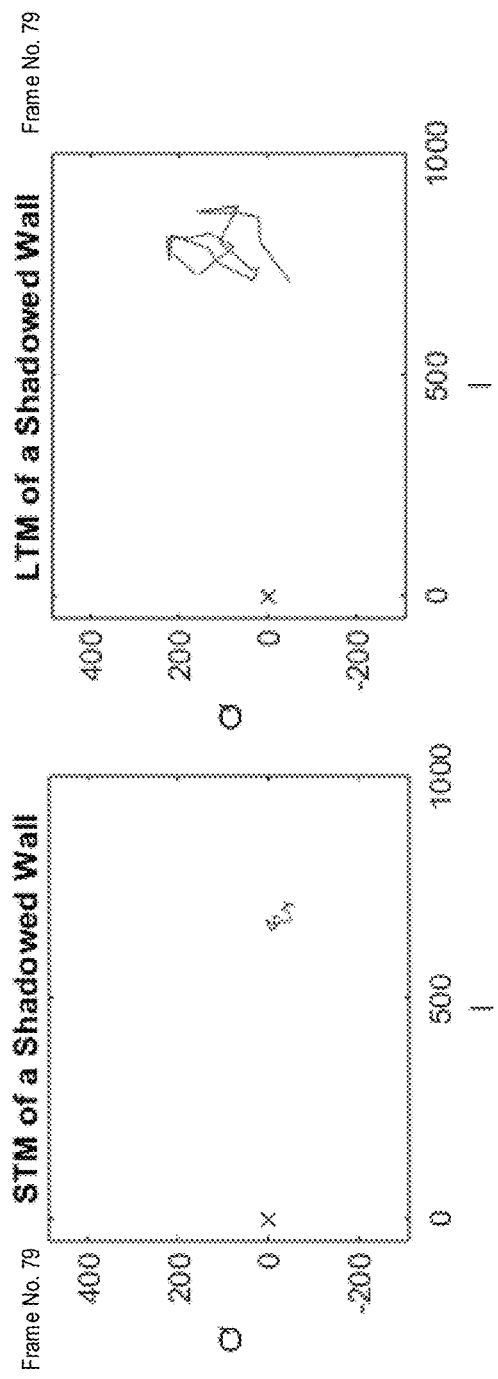
FIG. 13  FIG. 14  FIG. 15  FIG. 16

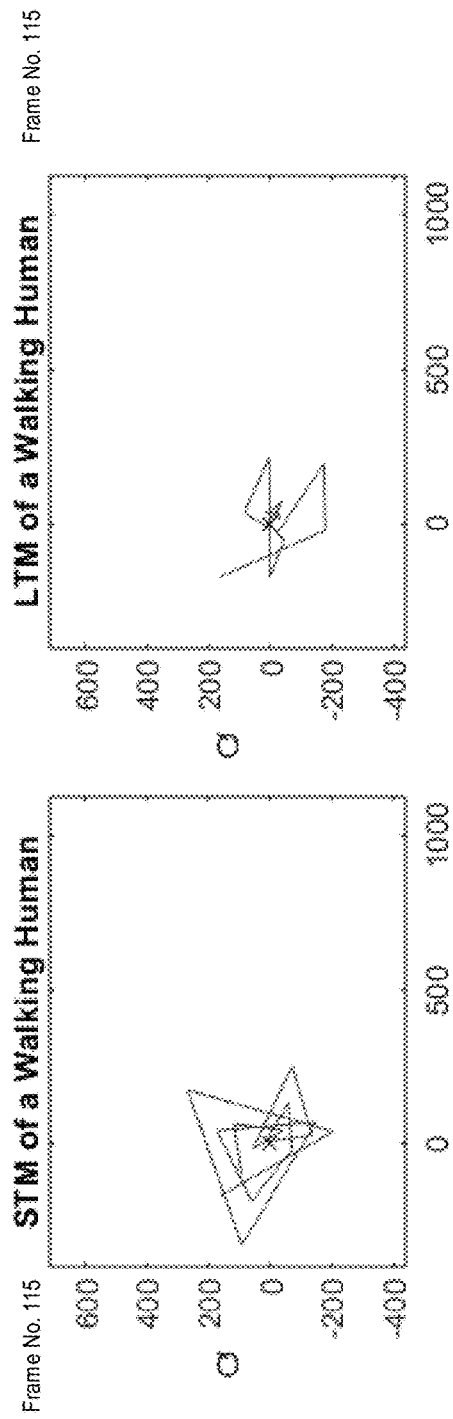
FIG. 21
FIG. 22
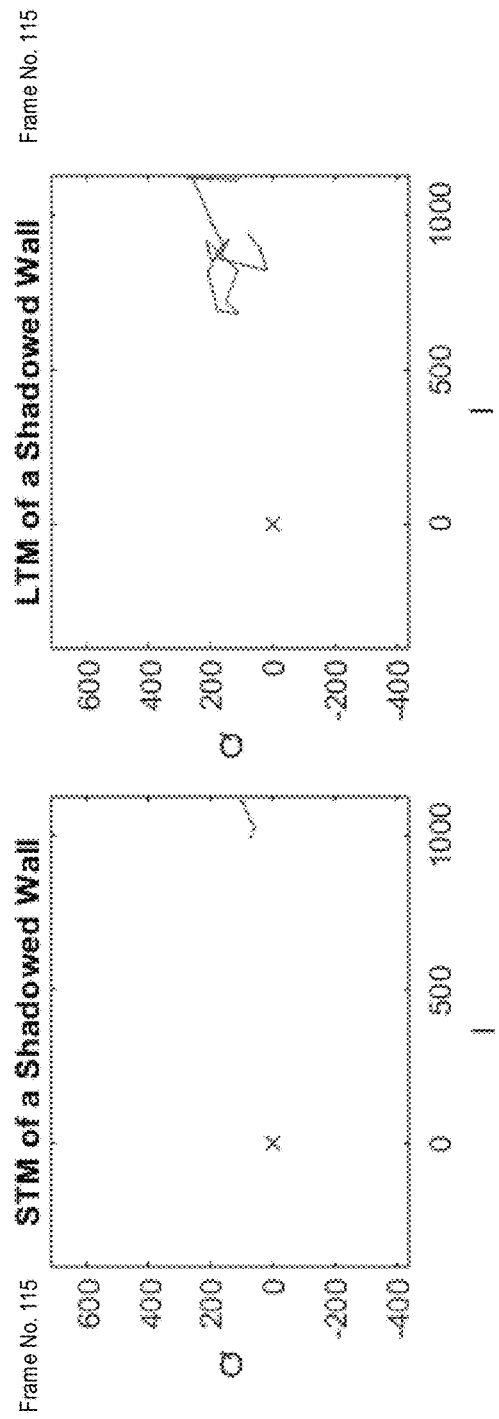
FIG. 23
FIG. 24

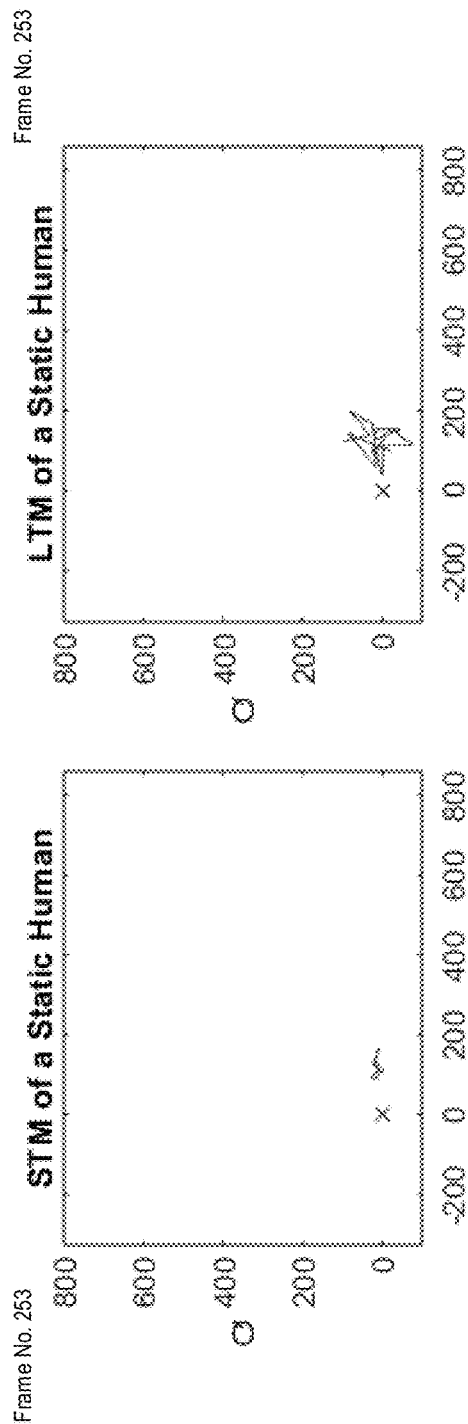
FIG. 25
FIG. 26
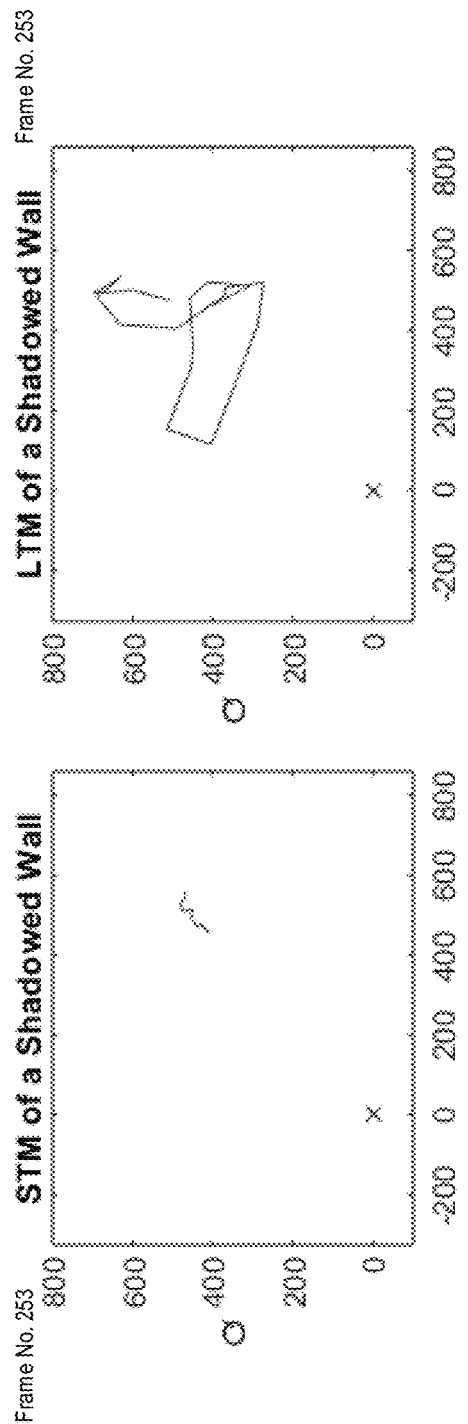
FIG. 27
FIG. 28

RADAR-BASED TARGET TRACKING USING MOTION DETECTION

TECHNICAL FIELD

The present disclosure relates generally to an electronic system and method, and, in particular embodiments, to a radar-based human tracking using motion detection.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method includes: receiving reflected radar signals with a millimeter-wave radar; performing a range discrete Fourier Transform (DFT) based on the reflected radar signals to generate in-phase (I) and quadrature (Q) signals for each range bin of a plurality of range bins; for each range bin of the plurality of range bins, determining a respective strength value based on changes of respective I and Q signals over time; performing a peak search across the plurality of range bins based on the respective strength values of each of the plurality of range bins to identify a peak range bin; and associating a target to the identified peak range bin.

In accordance with an embodiment, a device includes: a millimeter-wave radar configured to transmit chirps and receive reflected chirps; and a processor configured to: perform a range discrete Fourier Transform (DFT) based on the reflected chirps to generate in-phase (I) and quadrature (Q) signals for each range bin of a plurality of range bins, for each range bin of the plurality of range bins, determine a respective strength value based on changes of respective I and Q signals over time, perform a peak search across the plurality of range bins based on the respective strength values of each of the plurality of range bins to identify a peak range bin, and associate a target to the identified peak range bin.

In accordance with an embodiment, a method including: receiving reflected radar signals with a millimeter-wave radar; performing a range Fast Fourier Transform (FFT) based on the reflected radar signals to generate in-phase (I) and quadrature (Q) signals for each range bin of a plurality of range bins; for each range bin of the plurality of range bins, determining a respective short term movement value based on changes of respective I and Q signals in a single frame; performing a peak search across the plurality of range bins based on the respective short term movement values of each of the plurality of range bins to identify a short term peak range bin; and associating a target to the identified short term peak range bin.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 shows a flow chart of an embodiment method for tracking humans using the state machine of FIG. 4, according to an embodiment of the present invention;

FIG. 7 shows a block diagram of parameters tracked by each track tracked using the method of FIG. 6, according to an embodiment of the present invention;

FIG. 9 shows a flow chart of an embodiment method for generating range data, according to an embodiment of the present invention;

FIGS. 13-28 show I-Q plots for different frames of the maps of FIGS. 10 and 11, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
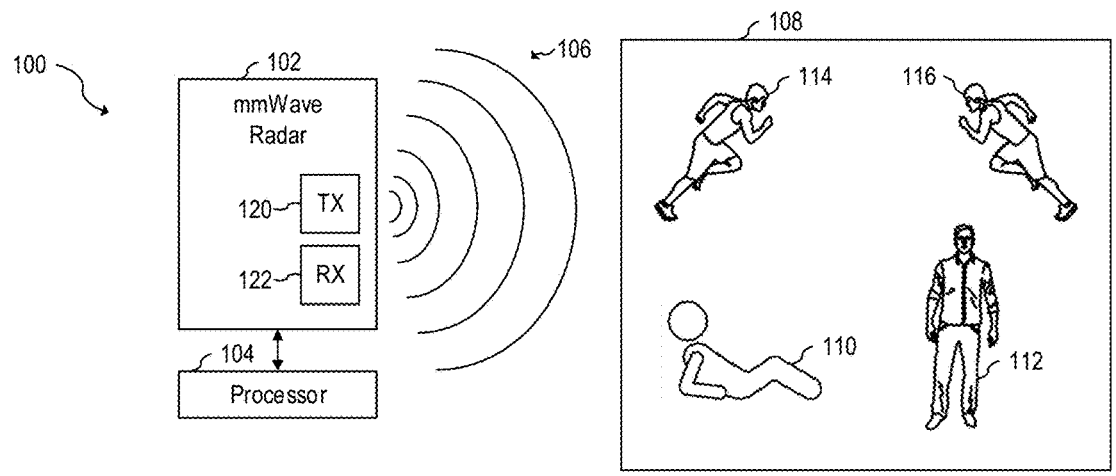
FIG. 1 shows a radar system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a radar-based human tracking system and method using motion detection. Embodiments of the present invention may be used for tracking other types of targets, such as animals (e.g., a dog), or autonomous objects, such as robots.

In an embodiment of the present invention, a millimeter-wave radar performs target detection by movement investigation of every range bin instead of performing a conventional range FFT peak search. The movement investigation is performed by micro-Doppler evaluation in the in-phase (I) and quadrature (Q) plane instead of using a conventional Doppler Fast Fourier Transform (FFT). In some embodiments, the millimeter-wave radar tracks one or more targets using a plurality of states.

A radar, such as a millimeter-wave radar, may be used to detect and track humans. Conventional frequency-modulated continuous-wave (FMCW) radar systems sequentially transmit a linearly increasing frequency waveform, called chirp, which after reflection by an object is collected by a receiver antenna. The radar may operate as a monostatic radar, in which a single antenna is simultaneously working as transmitting and receiving antenna, or as bistatic radar, in which dedicated antennas are used from transmitting and receiving radar signals, respectively.

Afterward, the transmitted and received signals are mixed with each other in the RF part, resulting in an intermediate frequency (IF) signal that is digitized using an analog-to-digital converter (ADC).

The IF signal is called beat signal and contains a beat frequency for all targets. After bandpass filtering the IF signal, the fast Fourier transform (FFT) is applied to the digitized and filtered IF signal to extract the range information of all targets from the radar data. This procedure is called range FFT and results in range data.

The first dimension of the range data includes all samples per chirp (fast-time) for range estimation. The second dimension of the range data includes data of the same range bit from different chirps in a frame (slow-time) for velocity estimation.

Conventionally, targets are detected based on a peak search over the fast-time dimension of the range data, where targets are detected when the amplitude of a range bin is above a threshold. Target velocities are estimated by using the so-called Doppler FFT along the slow-time dimension for the corresponding range bin (the range bin where the target was detected).

In an embodiment of the present invention, a millimeter-wave radar performs target detection by movement investigation of every range bin. In some embodiments, movement investigation includes determining a short term movement (STM) value and a long term movement (LTM) value for every range bin. A short term movement value is determined for each range bin based on I and Q signals of a single frame. A long term movement value is determined for each range bin based on I and Q signals over a plurality of frames. A peak search is performed to identify short term movement peaks above a predetermined STM threshold and long term movement peaks above a predetermined LTM threshold. One or more targets are identified based on the STM peaks and the LTM peaks.

FIG. 1 shows radar system 100, according to an embodiment of the present invention. Radar system 100 includes millimeter-wave radar 102 and processor 104. In some embodiments, millimeter-wave radar 102 includes processor 104.

During normal operation, millimeter-wave radar 102 transmits a plurality of radiation pulses 106, such as chirps, towards scene 108 using transmitter (TX) circuit 120. In some embodiments the chirps are linear chirps (i.e., the instantaneous frequency of the chirp varies linearly with time).

The transmitted radiation pulses 106 are reflected by objects in scene 108. The reflected radiation pulses (not shown by FIG. 1), which are also referred to as the echo signal, are received by millimeter-wave radar 102 using receiver (RX) circuit 122 and processed by processor 104 to, for example, detect and track targets such as humans.

The objects in scene 108 may include static humans, such as lying human 110, humans exhibiting low and infrequent motions, such as standing human 112, and moving humans, such as walking human 114 and running human 116. The objects in scene 108 may also include static objects (not shown), such as furniture, walls, and periodic movement equipment. Other objects may also be present in scene 108.

Processor 104 analyses the echo data to determine the location of humans using signal processing techniques. For example, in some embodiments, processor 104 performs target detection by movement investigation of every range bin of the range data. In some embodiments, processor 104 performs the movement investigation for a particular range bin by micro-Doppler evaluation in the IQ plane of the particular range bin. In some embodiments, processor 104 tracks detected target(s), e.g., using a plurality of states. In some embodiments, tracking algorithm, such as using an alpha-beta filter, may be used to track the target(s). In some embodiments, other tracking algorithms, such as algorithms using a Kalman filter may be used.

Processor 104 may be implemented as a general purpose processor, controller or digital signal processor (DSP) that includes, for example, combinatorial circuits coupled to a memory. In some embodiments, processor 104 may be implemented with an ARM architecture, for example. In some embodiments, processor 104 may be implemented as a custom application specific integrated circuit (ASIC). Some embodiments may be implemented as a combination of hardware accelerator and software running on a DSP or general purpose micro-controller. Other implementations are also possible.

Millimeter-wave radar 102 operates as an FMCW radar that includes a millimeter-wave radar sensor circuit, and one or more antenna(s). Millimeter-wave radar 102 transmits (using TX 120) and receives (using RX 122) signals in the 20 GHz to 122 GHz range via the one or more antenna(s) (not shown). For example, in some embodiments, millimeter-wave radar 102 has 200 MHz of bandwidth while operating in a frequency range from 24.025 GHz, to 24.225 GHz. Some embodiments may use frequencies outside of this range, such as frequencies between 1 GHz and 20 GHz, or frequencies between 122 GHz, and 300 GHz.

In some embodiments, the echo signals received by millimeter-wave radar 102 are processed in the analog domain using band-pass filter (BPFs), low-pass filter (LPFs), mixers, low-noise amplifier (LNAs), and intermediate frequency (IF) amplifiers in ways known in the art. The echo signal is then digitized using one or more ADCs for further processing. Other implementations are also possible.

Figure 2:
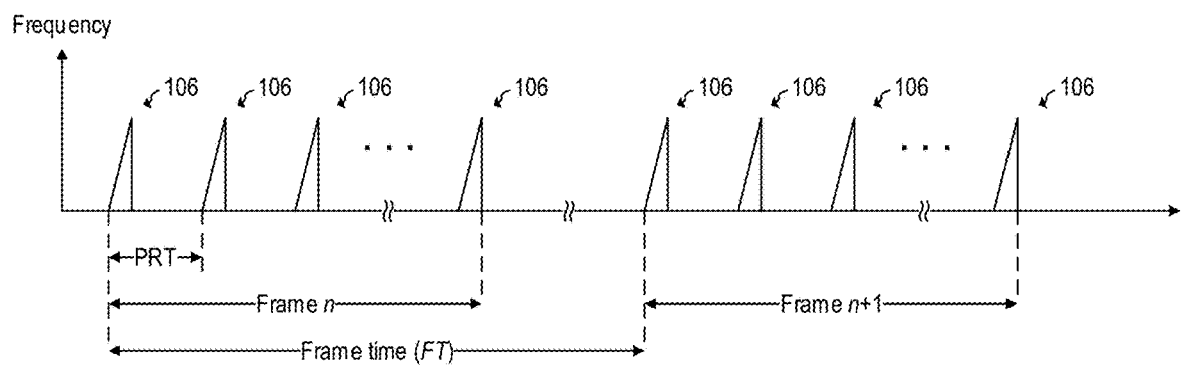
FIG. 2 shows a sequence of radiation pulses transmitted by the transmitted circuit of FIG. 1, according to an embodiment of the present invention.

FIG. 2 shows a sequence of radiation pulses 106 transmitted by TX circuit 120, according to an embodiment of the present invention. As shown by FIG. 2, radiation pulses 106 are organized in a plurality of frames and may be implemented as up-chirp. Some embodiments may use down-chirps or a combination of up-chirps and down-chirps.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

Frames of chirps 106 include a plurality of chirps. For example, in some embodiments, each frame of chirps includes 16 chirps. Some embodiments may include more than 16 chirps per frame, such as 20 chirps, 32 chirps, or more, or less than 16 chirps per frame, such as 10 chirps, 8 chirps, or less. In some embodiments, each frame of chirps includes a single chirp.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n-Fi is equal to PRT. Other embodiments may use or result in a different timing.

Figure 3:
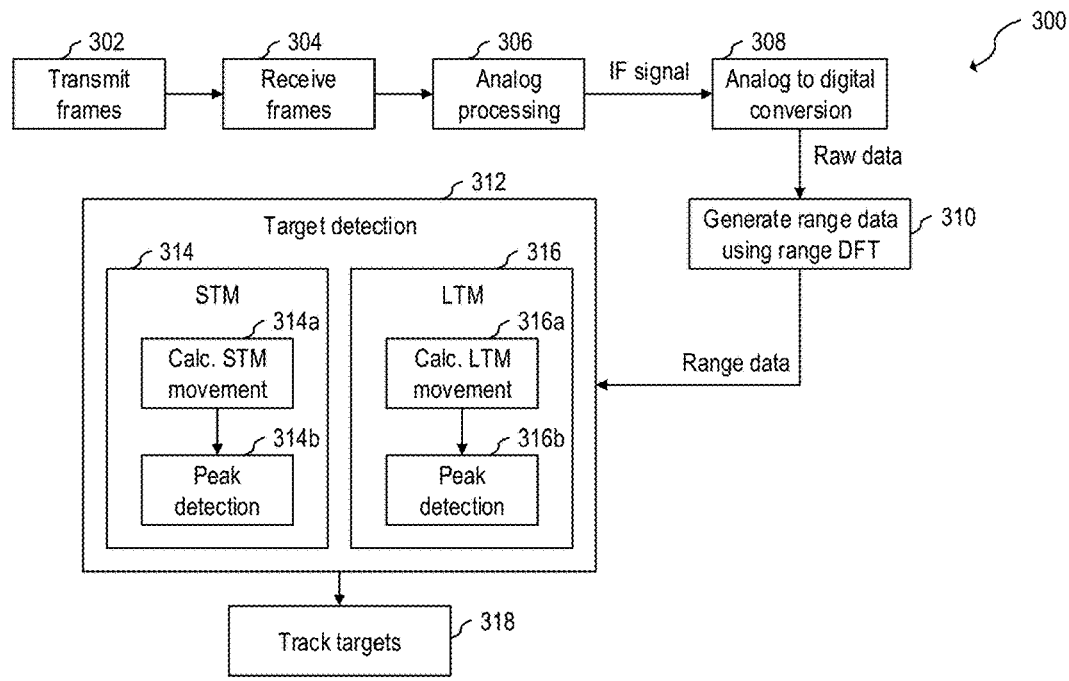
FIG. 3 shows a flow chart of an embodiment method for detecting and tracking human targets, according to an embodiment of the present invention.

FIG. 3 shows a flow chart of embodiment method 300 for detecting and tracking human targets, according to an embodiment of the present invention. Method 300 may be performed, e.g., by processor 104.

During step 302, millimeter-wave radar 102 transmits, e.g., linear chirps organized in frames (such as shown by FIG. 2) using TX circuit 120. For example, the frequency of a transmitted chirp with bandwidth B and duration T can be expressed as $$f_T(t) = f_c + \frac{B}{T}t \tag{1}$$

where $f_c$ is the ramp start frequency.

After reflection from objects, RX circuit 122 receives reflected chirps during step 304.

The reflected chirps received during step 304 are processed in the analog domain in a conventional manner during step 306 to generate an IF signal. For example, the reflected chirp is mixed with a replica of the transmitted signal resulting in the beat signal.

The IF signal is converted to the digital domain during step 308 (using an ADC) to generate raw data for further processing.

During step 310, a range discrete Fourier transform (DFT), such as a range FFT is performed on the raw data to generate range data. For example, in some embodiments, the raw data are zero-padded and the fast Fourier transform (FFT) is applied to generate the range data, which includes range information of all targets. In some embodiments, the maximum unambiguousness range for the range FFT is based on the PRT, the number of samples per chirp, chirp time, and sampling rate of the analog-to-digital converter (ADC). In some embodiments, the ADC has 12 bits. ADC's with different resolution, such as 10 bits, 14 bits, or 16 bits, for example, can also be used.

In some embodiments, the range FFT is applied on all samples of a chirp.

During step 312, target detection is performed by movement investigation of every range bin. Target detection is based on short term movement (STM) detection and/or long term movement (LTM) detection. Therefore, step 312 includes step 314 and/or step 316. Step 314 includes steps 314a and 314b. Step 316 includes steps 316a and 316b.

During step 314a, STM movement is determined for every range bin $R_r$ of a current frame by $$M_{STM,r} = \sum_{c=1}^{PN-1} \text{abs}(R_{r,c+1} - R_{r,c}) \tag{2}$$

Where R represents the complex output values of the range FFT, $R_r$ is the complex value at a specific range bin r, $M_{STM,r}$ represents the short term movement of the current frame for range bin r, PN represents the number of chirps per frame, and c represents a chirp index so that $R_{r,c}$ is a complex number (with I and Q components) associated with range bin $R_r$ of chirp c, and $R_{r,c+1}$ is a complex number (with I and Q components) associated with range bin $R_r$ of chirp c+1. In some embodiments, PN may be a value equal to or higher than 2, such as 8 or 16, for example.

Equation 2 may also be understood as the addition of all of the edges of an I-Q plot generated using the chirps of the current frame (such as shown, e.g., in FIGS. 13, 15, 17, 19, 21, 23, 25, 27). In such I-Q plot, the edges are the straight lines that connect the nodes, where each of the nodes represents the (I,Q) components for a particular chirp c of the current frame. The value $M_{STM,r}$ may also be referred to as a strength value and is indicative of short term movement (the higher the value the more movement detected in range bin r in fast-time for the current frame).

During step 314b, a peak search is performed over all short term movement values $M_{STM,r}$ and (local) peaks above a predetermined STM threshold $T_{M,STM}$ are identified. Since the strength of the peaks identified during step $314_b$ relate to short term movements, static objects are generally associated with a strength value that are below the predetermined STM threshold $T_{M,STM}$ (as shown, e.g., by FIGS. 29-34).

During step 316a, LTM movement is determined along the first chirp of the latest W frames by $$M_{LTM,r} = \sum_{\omega=1}^{W-1} \text{abs}(R_{r,1,w+1} - R_{r,1,w}) \quad (3)$$

where $M_{LTM,r}$ represents the long term movement of the current frame for range bin r, and w represents a frame index so that $R_{r,1,w}$ is a complex number (with I and Q components) associated with range bin $R_r$ of the first chirp of frame w, and $R_{r,1,w+1}$ is a complex number (with I and Q components) associated with the range bin $R_r$ of first chirp of frame w+1. Some embodiments may use a chirp index other than the first chirp to calculate $M_{LTM,r}$. In some embodiments, W may be a value equal to or higher than 2, such as 10 or 20, for example.

Equation 3 may also be understood as the addition of all of the edges of an I-Q plot (such as shown, e.g., in FIGS. 14, 16, 18, 20, 22, 24, 26, 28) that is generated using a single chirp (e.g., the first chirp) from each of the last W frames. In such I-Q plot, the edges are the straight lines that connect the nodes, where each of the nodes represents the (I,Q) components of the single chirp of a particular frame w. The value $M_{LTM,r}$ may also be referred to as a strength value and is indicative of long term movement (the higher the value the more movement detected in range bin r in slow-time for the last W frames).

During step 316b, a peak search is performed over all long term movement values $M_{LTM,r}$ and (local) peaks above a predetermined LTM threshold $T_{M,LTM}$ are identified. Since the strength of the peaks identified during step 316b relate to long term movements, static objects may, in certain circumstances (such as due to shadowing effects), be associated with a strength value that is above the predetermined LTM threshold $T_{M,LTM}$ (as shown by FIGS. 29-34).

During steps 314b and/or 316b, an order statistics (OS) constant false alarm rate (CFAR) (OS-CFAR) detector may be used to identify local peaks (peaks above the predetermined STM threshold $T_{M,STM}$ or LTM threshold $T_{M,LTM}$). Other search algorithm may also be used.

In some embodiments, $T_{M,LTM}$ is different than $T_{M,LTM}$. In other embodiments, $T_{M,LTM}$ is equal to $T_{M,STM}$. As a non-limiting example, in an embodiment, $T_{M,LTM}$ is equal to 50 and $T_{M,LTM}$ is equal to 200.

The peaks identified during steps 314a and/or 316b represent potential or actual targets. During step 318, some or all of the potential or actual targets are tracked.

Figure 4:
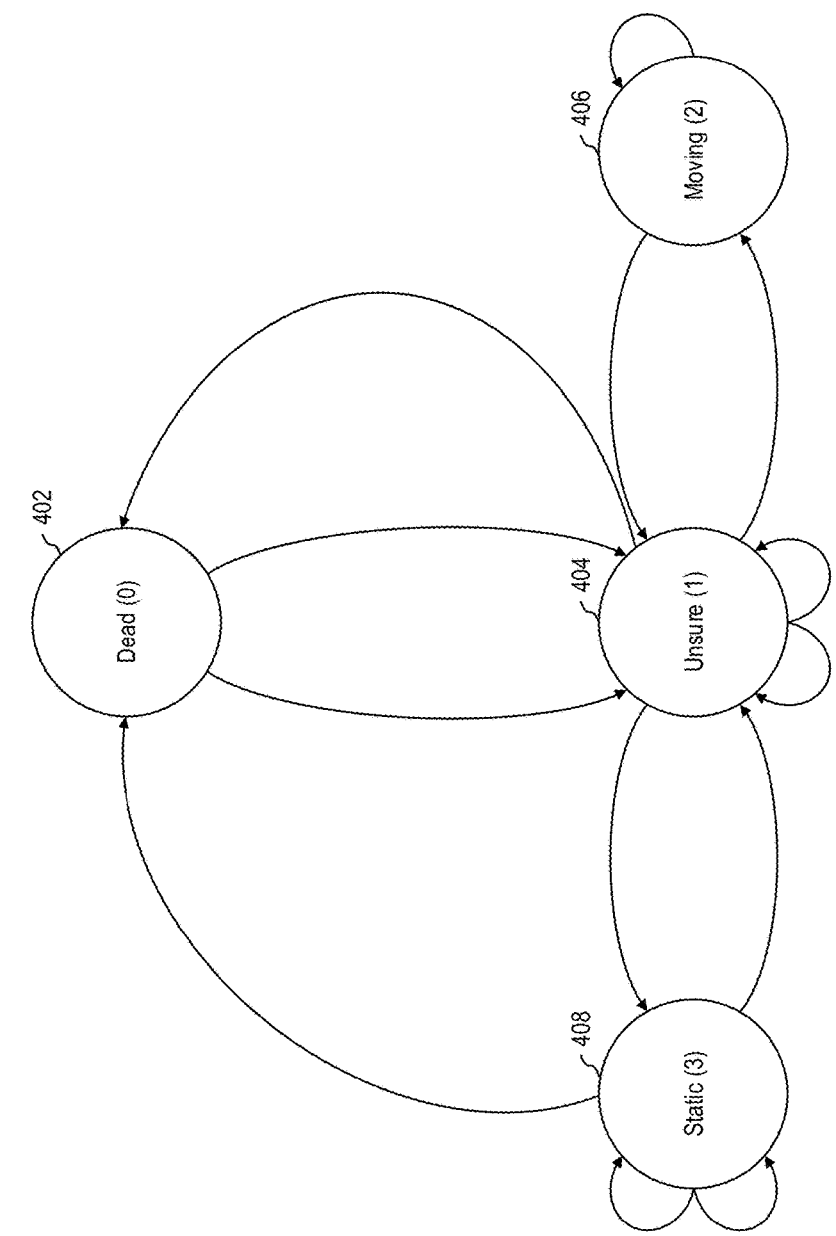
FIG. 4 shows a state diagram for tracking a human target, according to an embodiment of the present invention.

In some embodiments, a state machine (e.g., implemented in processor 104) may be used to track targets (e.g., during step 318). For example, FIG. 4 shows state diagram 400 for tracking a human target, according to an embodiment of the present invention. In some embodiments, target states are evaluated each frame n.

State diagram 400 includes dead state 402, unsure state 404, moving state 406, and static state 408. Dead state 402 is associated with a human target that is not being tracked (e.g., because the corresponding track has been killed or has not been created). Unsure state 404 is associated with a potential human target. Moving state 406 is associated with an actual human target that is moving. Static target 408 is associated with an actual human target that is static.

As will be described in more detail later, in some embodiments, a target is activated (and thus transitions from a potential target into an actual target) when the target transitions for the first time from unsure state 404 into moving state 406. Therefore, in some embodiments, a target cannot transition from dead state 402 to unsure state 404 and then directly into static state 408 without first being activated. As will be described in more detail later, since a target is in moving state 406 before being in static state 408, some embodiments advantageously prevent actively tracking static targets (e.g., such as a wall) that may appear to move at times (e.g., due to the shadowing effect).

As shown by FIG. 4, in some embodiments, a target cannot transition directly from moving state 406 to dead state 402, thereby advantageously allowing for keeping track of an actual target that may temporarily disappear (e.g., the target becomes undetected during step 312), e.g., because of noise or because the target stopped moving.

FIGS. 5A-5D show embodiment methods 500, 520, 550, and 570 for transitioning between states of state diagram 400, according to an embodiment of the present invention. FIG. 4 may be understood in view of FIGS. 5A-5D.

As shown by FIGS. 5A-5D, method 500 shows a flow chart for transitioning from dead state 402; method 520 shows a flow chart for transitioning from unsure state 404; method 550 shows a flow chart for transitioning from moving state 406; and method 570 shows a flow chart for transitioning from static state 408.

Figure 5B:
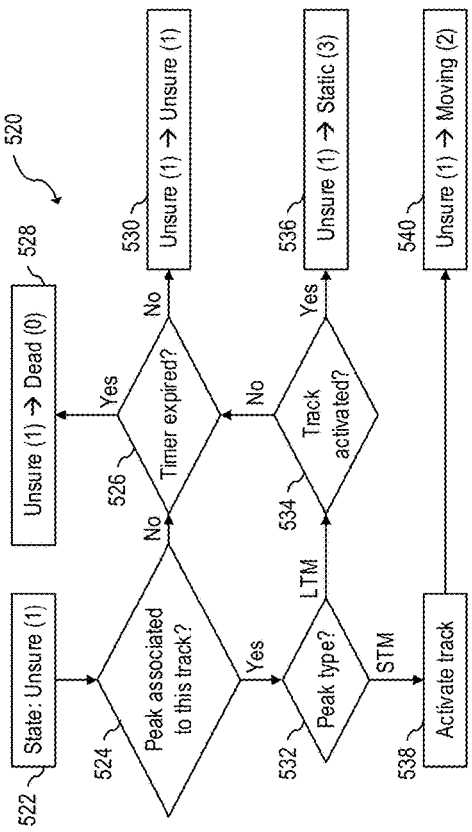
FIGS. 5A-5D show embodiment methods for transitioning between states of the state diagram of FIG. 4.
Figure 5A:
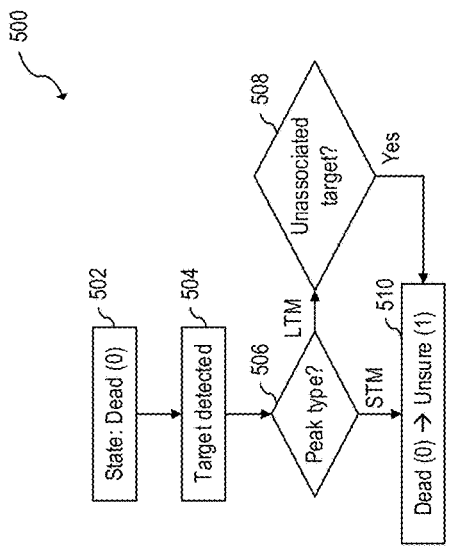

As shown by FIG. 5A, when a target is in dead state 402 and a target is detected during step 504 (which, e.g., corresponds to step 312), a track is created and the target transitions from dead state 402 into unsure state 404 (step 510) if it is determined during step 506 that the peak associated with the detected target is an STM peak (e.g., determined during step 314b).

As will be described in more detail later, an LTM peak and an STM peak that are close to each other may be associated to the same target. Therefore, if it is determined during step 506 that the peak is an LTM peak (e.g., determined during step 316b), then a track is created and the target transitions from dead state 402 into unsure state 404 (step 510) if it is determined during step 508 that the LTM peak is not associated with any STM peak.

As shown by FIG. 5B, when a target is in unsure state 404, a determination is made during step 524 as to whether a target peak detected in the current frame is associated with the track. If no peak is associated with the track, it is determined during step 526 whether a timer has expired. In some embodiments, the timer counts the time (e.g., the number of frames) in which the track tracking the target has not had any peaks (or any STM peaks) associated with it.

If it is determined during step 526 that the timer has expired, then the track is killed during step 528. Otherwise, the target remains in unsure state 404 during step 530. By waiting (e.g., by using a timer) before killing a track, some embodiments advantageously allow for temporarily keeping the track alive and thus for keeping track of an actual target that may temporarily disappear (e.g., the target becomes undetected during step 312), e.g., because of noise or because the target stopped moving.

If it is determined during step 524 that there is a peak associated to the track, then the type of peak is determined during step 532. If the peak associated to the track is an STM peak, then the track is activated during step 538 (thereby transitioning from tracking a potential target into tracking an actual target) and the state transitions from unsure state 404 into moving state 406 during step 540. In some embodiments, the track may be activated only after a plurality of frames exhibiting STM peaks associated with the track.

If the peak associated to the track is an LTM peak, then the state transitions from unsure state 404 into static state 408 during step 536 if it is determined that the track has been activated during step 534. Otherwise, step 526 is performed. In some embodiments, the track may transition from unsure state 404 into static state 408 only after a plurality of frames of the track being in unsure state 404.

Figure 5D:
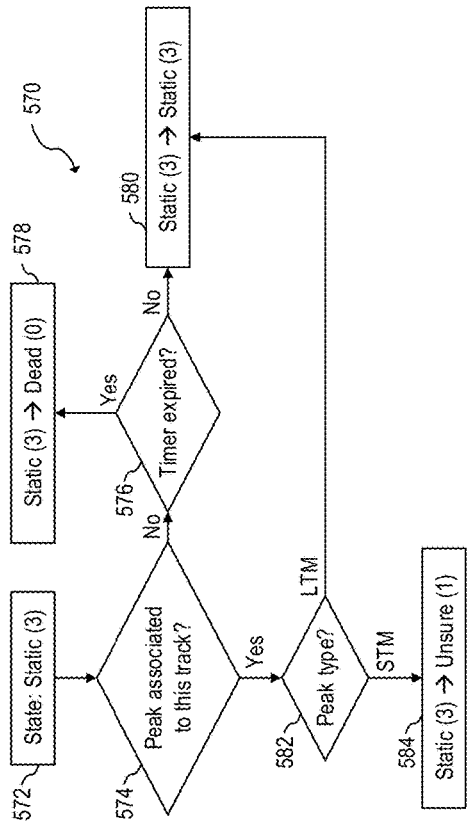
Figure 5C:
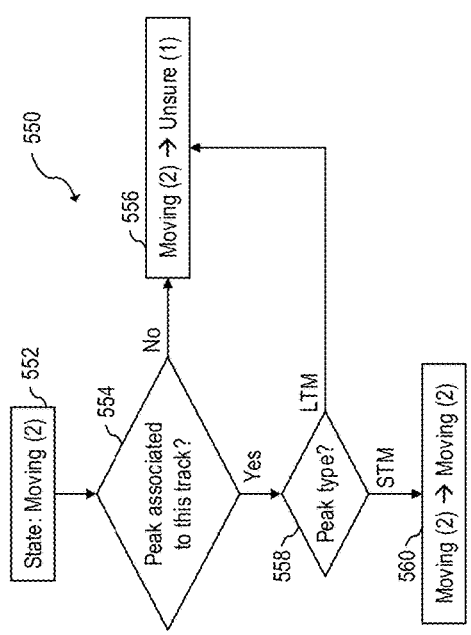

As shown by FIG. 5C, when a target is in moving state 406, a determination is made during step 554 as to whether a target peak detected in the current frame is associated with the track. If no peak is associated with the track, then the target transitions from moving state 406 into unsure state 404 during step 556.

If during step 554 it is determined that a peak is associated with the track, then the type of peak is determined during step 558. If it is determined during step 558 that the peak associated with the track is an STM peak, then the target remains in moving state 408 during step 560. Otherwise, if the peak associated with the track is an LTM peak, then the target transitions from moving state 406 into unsure state 404 during step 556.

As shown by FIG. 5D, when a target is in static state 408, a determination is made during step 574 as to whether a target peak detected in the current frame is associated with the track. If no peak is associated with the track, it is determined during step 576 whether a timer has expired (e.g., in a similar manner as in step 526). If it is determined during step 576 that the timer has expired, then the track is killed during step 578. Otherwise, the target remains in static state 404 during step 580.

If during step 574 it is determined that a peak is associated with the track, then the type of peak is determined during step 582. If it is determined during step 582 that the peak associated with the track is an STM peak, then the target transitions from static state 408 into unsure state 404 during step 584. Otherwise, if the peak associated with the track is an LTM peak, then the target remains in static state 408 during step 580.

FIG. 6 shows a flow chart of embodiment method 600 for tracking humans using state machine 400, according to an embodiment of the present invention. Step 318 may be implemented as method 600.

As shown by FIG. 6, method 600 includes step 602 for updating all active tracks, step 612 for killing expired tracks, step 614 for assigning new tracks, and step 620 for generating estimated range and velocity for each tracked target. Step 602 is performed for each active (non-killed) track and includes steps 604, 606, 608, and 610. Step 614 includes steps 616 and 618.

During step 604, the range of the target tracked by the track is predicted, e.g., by $$R_{pred} = R_{w-1} - FT \cdot S_{w-1} \qquad (4)$$

where $R_{pred}$ is the predicted range for the current frame, FT is the frame time, and w is the frame index so that $R_{w-1}$ represents the range of the target in the previous (latest) frame (e.g., 704), and $S_{w-1}$ represents the velocity of the target in the previous (latest) frame (e.g., 708).

During step 606, a suitable STM peak is associated with the active tracks. For example, in some embodiments, when the range $R_{STM}$ associated with an STM peak (e.g., identified in step 314b) is closer than a predetermined STM distance $R_{STM\_th}$ to the predicted range $R_{pred}$ of the track (i.e., if the deviation between $R_{STM}$ and $R_{pred}$ is lower than $R_{STM\_th}$), then red of the STM peak is associated with the track. In some embodiments, the STM peak that is closest to the predicted range $R_{pred}$ of the track is associated with the track.

During step 608, a suitable LTM peak is associated with the active track. For example, in some embodiments, when the range $R_{LTM}$ associated with an LTM peak (e.g., identified in step 316b) is closer than a predetermined LTM distance $R_{LTM\_th}$ to the predicted range $R_{pred}$ of the track (i.e., if the deviation between $R_{LTM}$ and $R_{pred}$ is lower than $R_{LTM\_th}$), then red of the LTM peak is associated with the track. In some embodiments, the LTM peak that is closest to the predicted range $R_{pred}$ of the track is associated with the track.

In some embodiments, the deviation is measured with respect to $R_{STM}$ associated with the track instead of with $R_{pred}$. In some embodiments, threshold $R_{STM\_th}$ is equal to threshold $R_{LTM\_th}$. In other embodiments, threshold $R_{STM\_th}$ is different from threshold $R_{LTM\_th}$.

During step 610, the state of the track is updated based on the associated STM peak and LTM peak. For example, if there is an STM peak associated with the track, steps 506, 532, 558, and 582 output "STM" irrespective of whether there is an LTM peak associated with the track. If there is an LTM peak associated with the track and no STM peak associated with the track, then steps 506, 532, 558, and 582 output "LTM." If a track does not have any peak associated with it, then steps 524, 554, and 574 output "No."

During step 612, expired tracks are killed. For example, during step 612, for each active track, steps 528 and 578, if applicable, are performed.

During step 616, a new track is created (e.g., during step 510) for each STM peak not associated with any tracks. Similarly, during step 618, a new track is created (e.g., during step 510) for each LTM peak not associated with any tracks. In some embodiments, when an STM peak is assigned to a new track during step 616, a corresponding LTM peak (e.g., the LTM peak closest to $R_{STM}$) is also assigned to the same new track during step 616. After assigning all STM peaks and corresponding LTM peaks to respective tracks, new tracks are assigned for any remaining unassociated LTM peaks during step 618.

During step 620, for each active track, the estimated range and velocity for the current frame is generated. For example, in some embodiment, the range for the current frame $R_w$ may be calculated by $$R_w = \beta \cdot R_{est} + (1-\beta) \cdot R_{w-1} \qquad (5)$$

where $$R_{est} = \alpha \cdot R_{meas} + (1-\alpha) \cdot R_{pred} \quad (6)$$

where α and β are factors that may be predetermined, where $R_{pred}$ is calculated using Equation 4, and where $R_{meas}$ is determined using Equation 7 if there is an STM peak associated with the target (step 606), with Equation 8 if there is no STM peaks associated with the target but there is an LTM peak associated with the target (step 608), and with Equation 9 if the target does not have an STM peak or LTM peak associated with it.

$$R_{meas} = R_{STM} \quad (7)$$

$$R_{meas} = R_{LTM} \quad (8)$$

$$R_{meas} = R_{pred} \quad (9)$$

In some embodiments, the velocity of the target for the current frame $S_w$ may be calculated by $$S_\omega = -\frac{R_w - R_{w-SL+1}}{(SL-1) \cdot FT} \quad (10)$$

where FT is the frame time, and SL represents the number of frames used for velocity determination. In some embodiments, SL is 10. Other values for SL may also be used, such lower than 10 (e.g., 9, 8, or lower), or higher than 10, such as 11, 12, or higher.

As shown by Equation 10, the velocity of the tracked target is determined using the derivative of the range instead of using Doppler FFT.

In some embodiments, the actual range and velocity generated during step 620 is a filtered version of the range and velocity calculated using Equations 5 and 10. For example, in some embodiments, a median filter is used over the last l frames to determine the actual range and velocity generated during step 620, where l is higher than 1, such as 3 or 10, for example. In some embodiments, l is equal to SL.

FIG. 7 shows block diagram 700 of parameters tracked by each track tracked using method 600, according to an embodiment of the present invention.

As shown by FIG. 7, each active track (e.g., created during step 510 and not killed) has a track identification code 702. Each active track tracks either a potential target or an actual target, and such track state is tracked by parameter 714. Tracks tracking actual targets are referred to as activated tracks (A=1), and tracks tracking potential targets are referred to as non-activated tracks (A=0).

As shown by FIG. 7, each active track tracks the latest range (704) and velocity (708) of the tracked target (e.g., determined during step 620). Each track also has the history of range (706) of the tracked target, which may be used for Equation 10, and the history of velocity (710) of the tracked target. In some embodiments, range history 706 and/or velocity history 710 may also be used during step 620 for generating filtered versions of the range and velocity.

Each track also tracks the current state (712) of the tracked target, which is one of states 402, 404, 406 and 408. Each track also has a counter (716) which is used, e.g., for implementing a timer (e.g., as used in steps 526 and 576). Each track also has an alpha factor (718) which is used, e.g., in Equation 6.

Figure 8A:
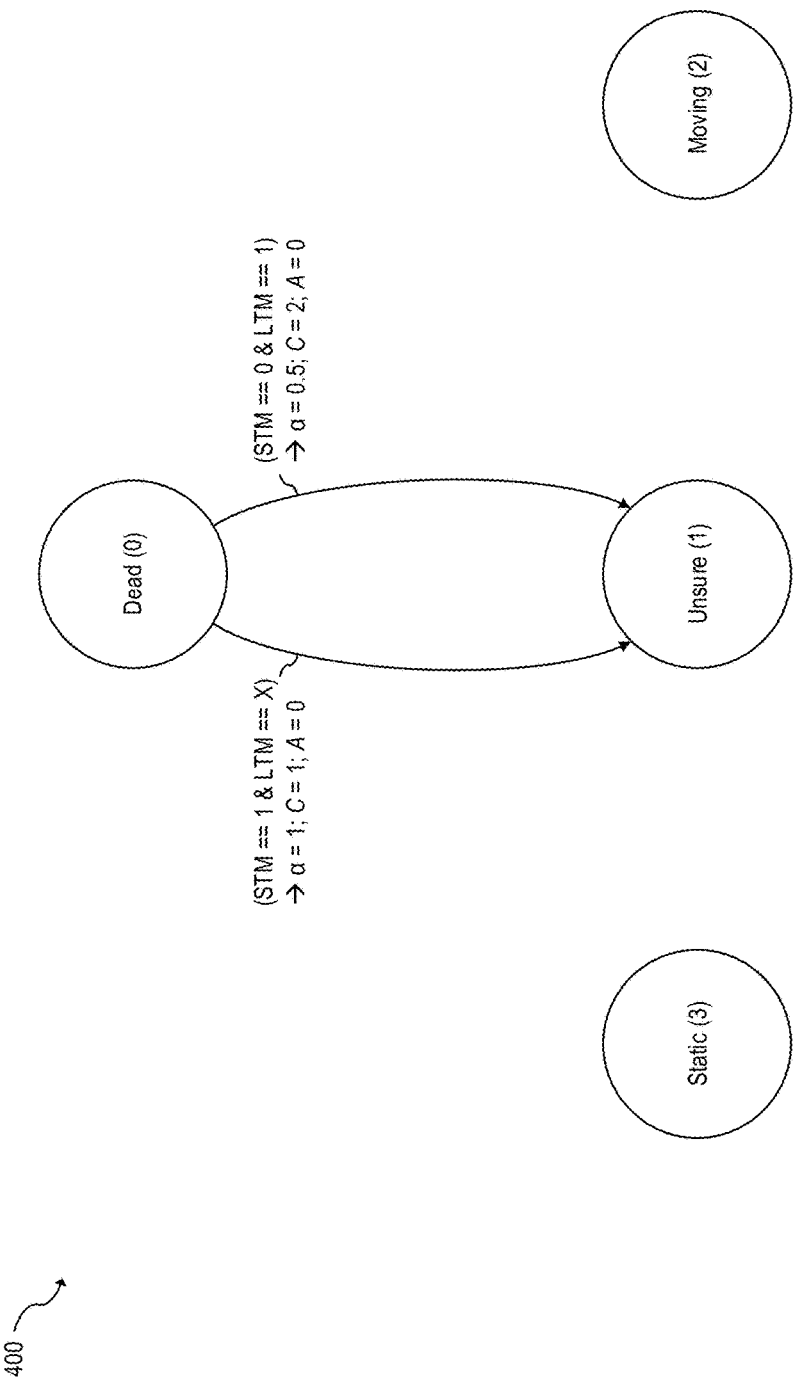
FIGS. 8A-8D illustrate transitions between states of the state diagram of FIG. 4 using the parameters of FIG. 7, according to an embodiment of the present invention.
Figure 8B:
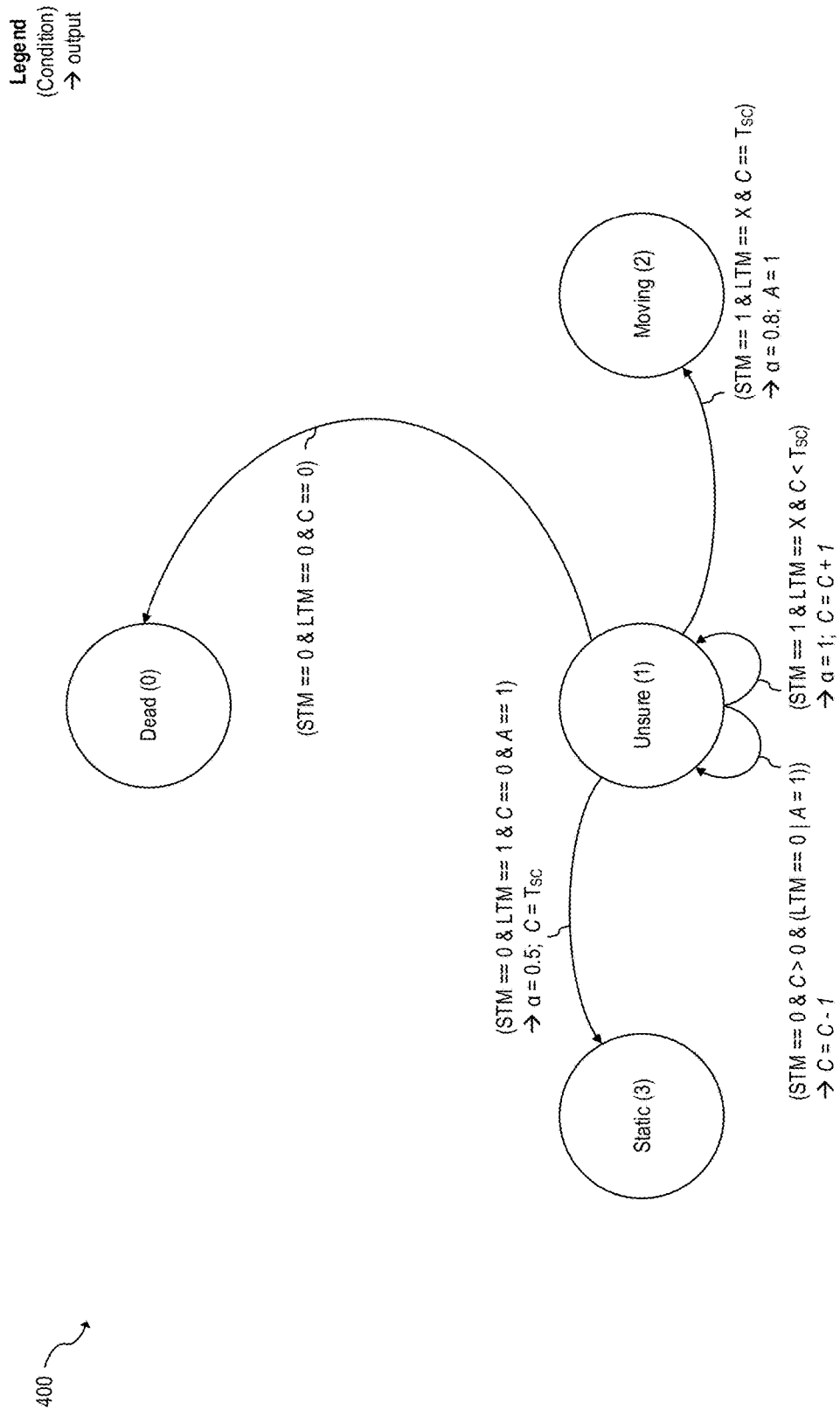
Figure 8C:
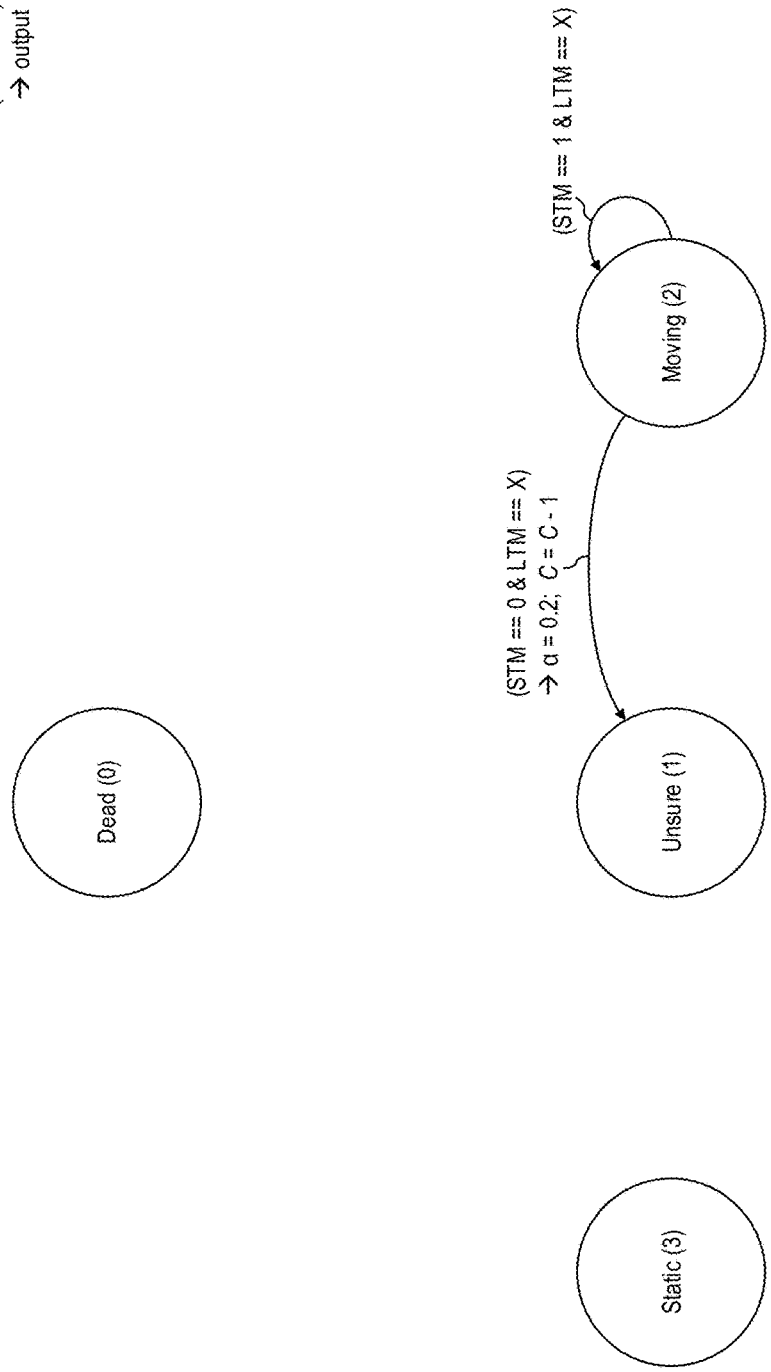
Figure 8D:
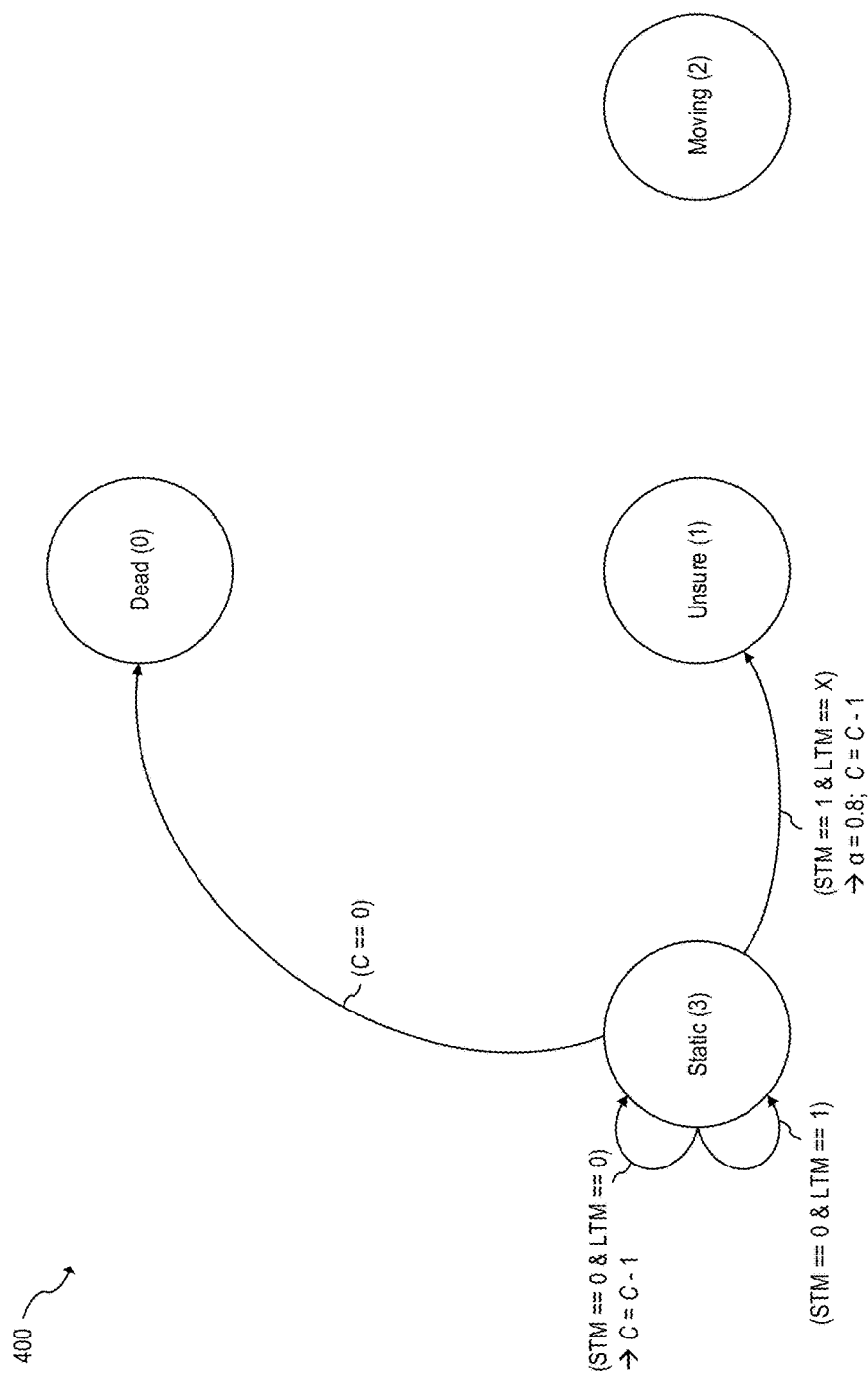

FIGS. 8A-8D illustrate transitions between states of state diagram 400 using parameters 700, according to an embodiment of the present invention. FIG. 8A illustrates transitions from dead state 402, and illustrates a possible implementation of method 500, according to an embodiment. FIG. 8B illustrates transitions from unsure state 404, and illustrates a possible implementation of method 520, according to an embodiment. FIG. 8C illustrates transitions from moving state 406, and illustrates a possible implementation of method 550, according to an embodiment. FIG. 8D illustrates transitions from dead state 408, and illustrates a possible implementation of method 570, according to an embodiment.

As shown by FIG. 8A, when an STM peak is associated with the target (STM==1), e.g., as shown in step 506, the target transitions from dead state 402 into unsure state 404 (step 510) regardless of whether there is an LTM peak associated with the target (LTM==X). During such transition, the alpha factor α (718) is set to 1, and the counter (716) is set to 1 (C=1). As shown by FIG. 8A, the track is not activated (A=0).

As also shown by FIG. 8A, when an LTM peak is associated with a target (LTM==1) that does not have an associated STM peak, e.g., as shown in step 506, the target transitions from dead state 402 into unsure state 404 (step 510). During such transition, the alpha factor α (718) is set to 0.5, and the counter (716) is set to 2 (C=2). As shown by FIG. 8A, the track is not activated (A=0).

As shown by FIG. 8B, when the counter is greater than 0 (C>0) and no STM peak is associated with the target (STM==0), and either no LTM peak is associated with the target (LTM==0) or the track is not activated (A=0), then the counter is decremented (C=C−1). When the counter reaches 0 (output "Yes" from step 526), and there is no LTM peak associated with the track (LTM==0), the track is killed (step 528). If when the counter reaches 0 (C==0), there is an LTM peak (LTM==1) associated with the track (step 532 outputs "LTM"), and if the track has been activated (A==1), then the counter is set to count $T_{SC}$ (C=$T_{SC}$), the alpha factor α is set to 0.5 (α=0.5) and the target transitions from unsure state 404 into static state 408 (step 536).

If there is an STM peak (STM==1) associated with the track, the alpha factor α is set to 1 (α=1) and the counter is incremented (C=C+1) until the counter reaches a predetermined count $T_{SC}$. When the counter reaches count $T_{SC}$, the track is activated (A=1) e.g., as shown in step 538, the alpha factor α is set to 0.8 (α=0.8), and the target transitions from unsure state 404 into moving state 406.

In some embodiments, count $T_{SC}$ is equal to 5. A different value may also be used for count $T_{SC}$, such as 6, 7, or higher, or 4, 3, or lower.

As show in FIG. 8B, a target remains a potential target for at least $T_{SC}$ frames before becoming an actual target (A=1). In some embodiments, waiting for a number of frames (e.g., 3 frames) before activating the track advantageously allows for killing tracks associated with non-human targets, such as ghost targets.

As shown by FIG. 8C, when the target is in moving state 406, it will remain in moving state while having an associated STM peak (output of step 558 equal to "STM"). When the target no longer has an associated STM peak (output of step 558 equal to "LTM" or output of step 554 equal to "No"), the counter is decremented (C=C−1), and the alpha factor α is set to 0.2 and the target transitions from moving state 406 into unsure state 404 (step 556). As shown by FIG. 8C, when the target transitions between moving state 406 into unsure state 404, the counter is set to $T_{SC}$−1 (since the target entered moving state 406 with the counter set to $T_{SC}$ and the counter value is not changed while the target is in moving state 406).

As shown by FIG. 8D, a target will remain in static state 408 when no STM peak is associated with it (STM==0). However, when there is also no LTM peak associated with it (LTM==0), the counter is decremented (C=C−1). When the counter reaches 0 (C==0; output of step 576 equal "Yes"), the track is killed (step 578). Since the target enters static state 408 with the counter equal to $T_{SC}$, the track is not killed for at least $T_{SC}$ frames. In some embodiments, avoiding killing the track for a number of frames (e.g., 3) advantageously allows for temporarily keeping the track alive and thus for keeping track of an actual target that may temporarily stop moving.

As shown by FIG. 8D, when an STM peak is associated with the target (output of step 582 equal to "STM"), the counter is decremented (C=C−1), the alpha factor α is set to 0.8 (α=0.8) and the target transitions from static state 408 into unsure state 404 (step 584).

FIG. 9 shows a flow chart of embodiment method 900 for generating range data, according to an embodiment of the present invention. Step 310 may be implemented as method 900.

During step 902, the data are calibrated. In some embodiments, calibration data are stored raw data with the size of one chirp. These data can be generated by recording only one chirp or fusing several chirps of one frame, etc. During step 902, these calibration data are subtracted from the acquired raw data.

During step 904, the DC offset is removed by a DC offset compensation step (also referred to as mean removal). In some embodiments, DC offset compensation advantageously allows for the removal of DC offset caused by RF non-idealities.

During step 906, a windowing operation is performed (e.g., using a Blackman window) to, e.g., increase the signal-to-noise ratio (SNR).

During step 908, zero-padding is performed, to, e.g., make enhance the accuracy of the range FFT output, and thus of the range estimation. In some embodiments, a factor of 4 is used for the zero-padding operation.

During step 910, a range FFT is performed by applying an FFT on the zero-padded data to generate the range data. The range FFT is applied on all samples of a chirp. Other implementations are also possible.

It is understood that some of the steps disclosed, such as steps 902, 904, 906, and/or 908, may be optional and may not be implemented.

FIGS. 10-48 illustrate experimental results, according to embodiments of the present invention. Unless stated otherwise, the measurement data associated with FIGS. 10-48 were acquired with a frame time FT of 50 ms.

Figure 10:
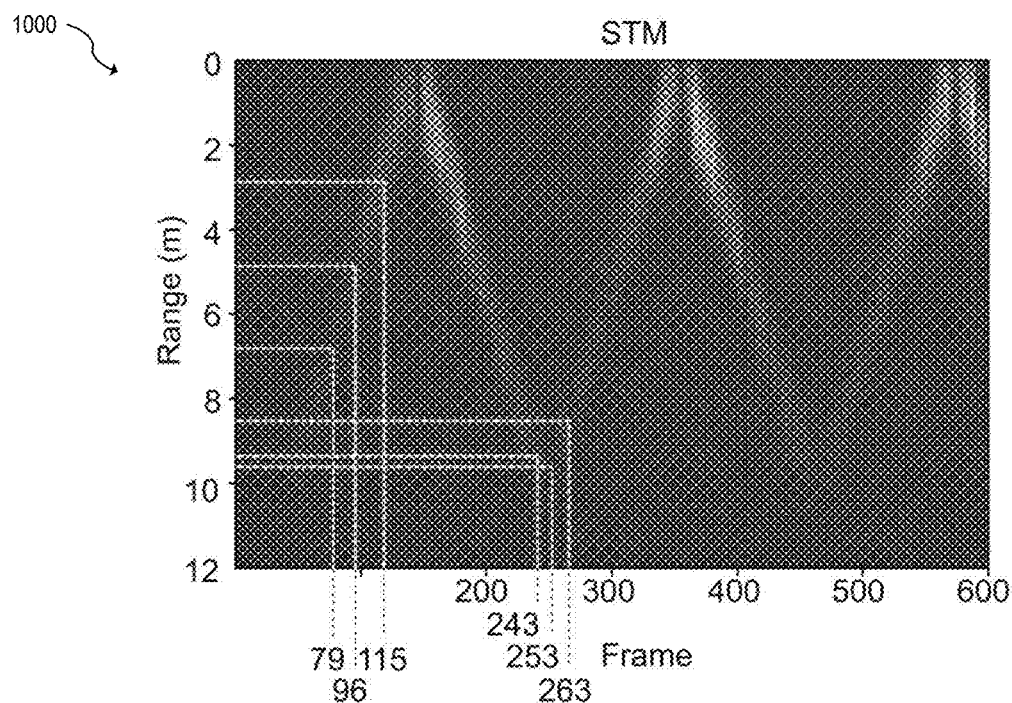
FIGS. 10 and 11 show maps illustrating the short term and long term movement, respectively, of a human walking towards and away from the millimeter-wave radar of FIG. 1, according to an embodiment of the present invention.

FIG. 10 shows map 1100 illustrating the short term movement of each range bin of every frame of human 114 walking towards and away from millimeter-wave radar 102, according to an embodiment of the present invention. The short term movement $M_{STM,r}$ illustrated in FIG. 10 is determined using Equation 2.

Figure 11:
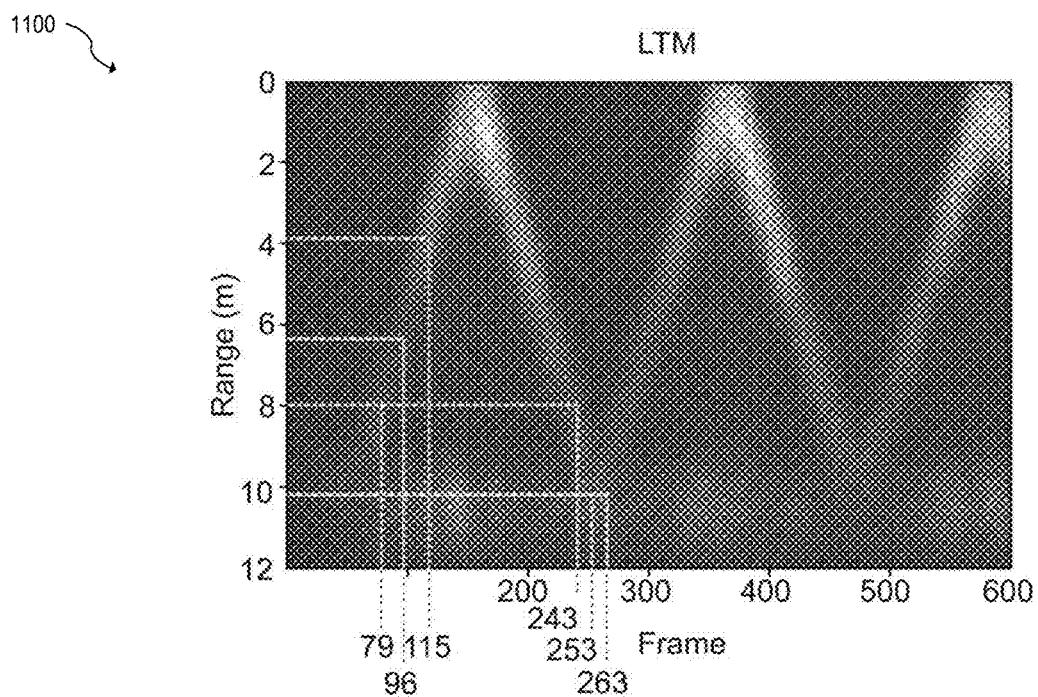

FIG. 11 shows map 1100 illustrating the long term movement of each range bin of every frame of the same human 114 walking towards and away from millimeter-wave radar 102, according to an embodiment of the present invention. The long term movement $M_{LTM,r}$ illustrated in FIG. 11 is determined using Equation 3.

As shown by FIGS. 10 and 11, the long term movement of human 114 is delayed with respect to the short term movement of human 114, as can be seen by the LTM and STM ranges of range bins 79, 96, and 115, for example. FIGS. 10 and 11 also show that static objects, such as a wall located at around 10.5 m from millimeter-wave radar 102 is captured by LTM (FIG. 11) but not by STM (FIG. 10).

As shown by FIG. 10, human target 114 temporarily disappears from the STM range at frame 253, when human target 114 is turning around and therefore is partially static. However, human target 114 is captured by LTM during frame 253.

Figure 12:
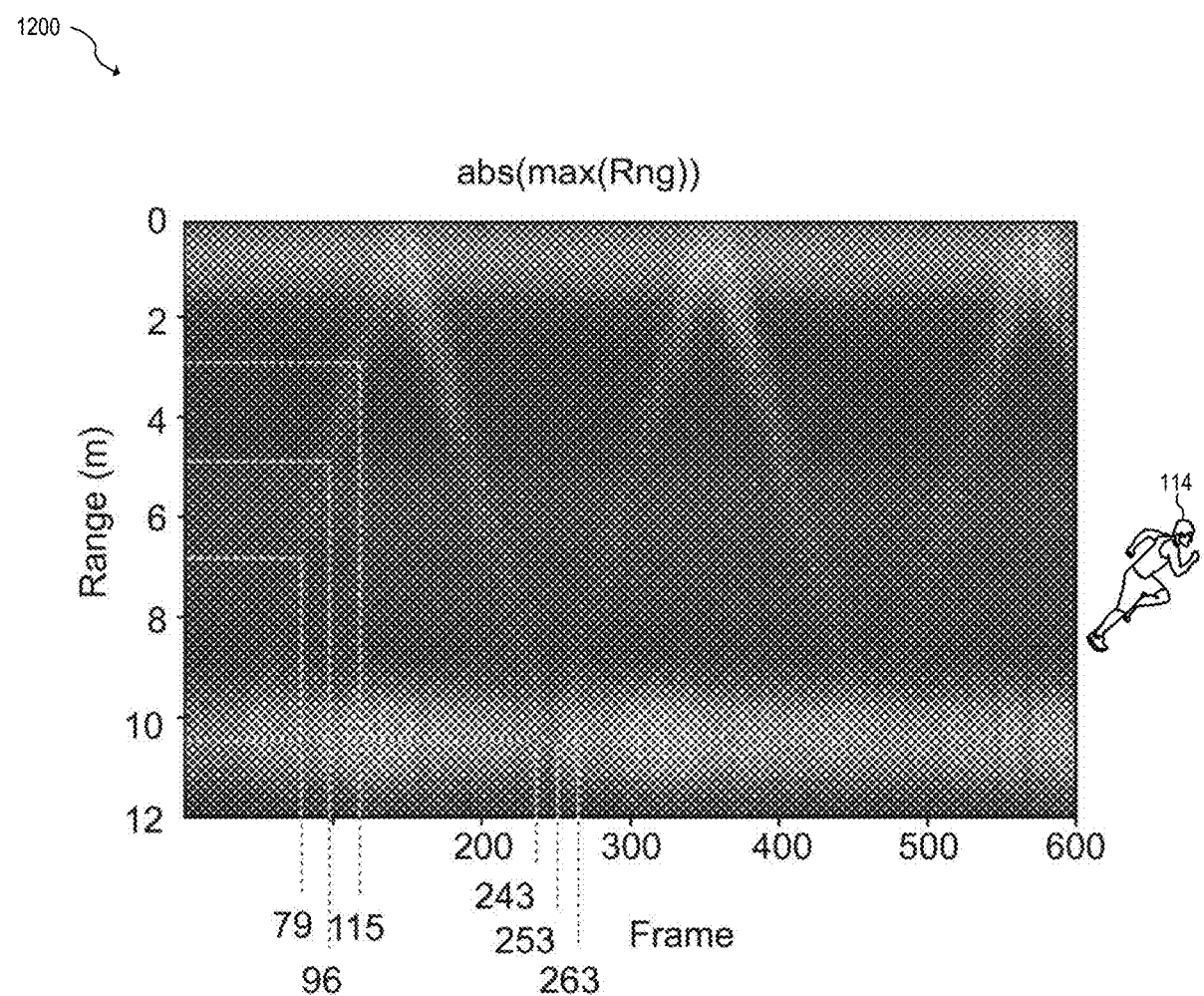
FIG. 12 shows a map illustrating the amplitude of the maximum range of the same human walking of FIGS. 10 and 11.

FIG. 12 shows map 1200 illustrating the amplitude of the maximum range of the same human 114 walking towards and away from millimeter-wave radar 102. Map 1200 may be generated based on the range data generated during step 310 or step 910. FIGS. 10-12 are generated based on the same raw data generated during step 308.

As shown by FIG. 12, the range data from map 1200 includes information about the movement of human target 114 as well as information about static objects, such as the wall.

FIGS. 13-28 show I-Q plots for different frames of maps 1000 and 1100, according to an embodiment of the present invention. FIGS. 29-34 show amplitude plots for Range FFT, STM, and LTM for different frames of maps 1000, 1100, and 1200, according to an embodiment of the present invention. FIGS. 13-34 may be understood together and in view of FIGS. 10-12.

FIGS. 13-16 and 29 correspond to frame 79 of maps 1000, 1100, and 1200. At frame 79, human target 114 is walking towards millimeter-wave radar 102 and is located around 7 m from millimeter-wave radar 102. A wall is located about 10.5 m from millimeter-wave radar 102.

Figure 29:
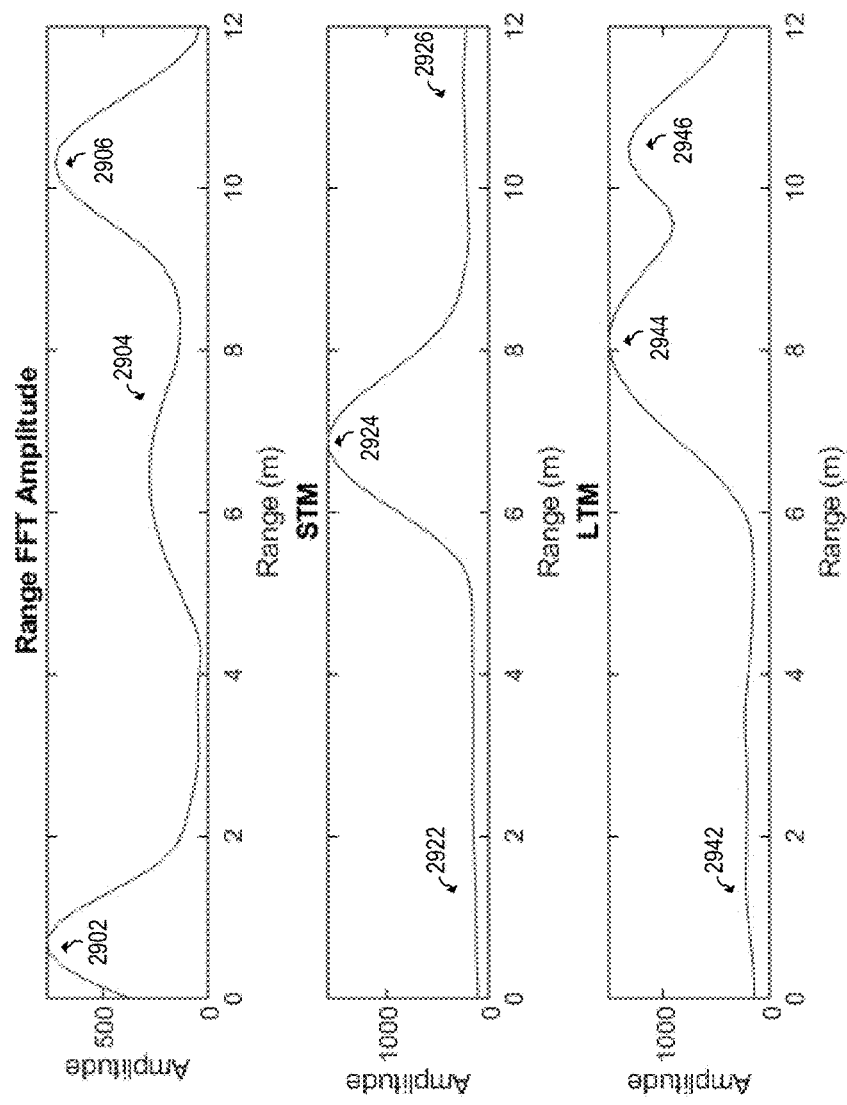
FIGS. 29-34 show amplitude plots for range FFT, STM, and LTM for different frames of the maps of FIGS. 10-12, according to an embodiment of the present invention.

As shown by FIG. 29, the range FFT amplitude plot (which corresponds to FIG. 12) includes peak 2902 corresponding to RF leakage, peak 2904 corresponding to human target 114, and peak 2906 corresponding to the wall. The STM amplitude plot (which corresponds to FIG. 10 and is calculated using Equation 2) includes peak 2924 corresponding to human target 114. The LTM amplitude plot (which corresponds to FIG. 11 and is calculated using Equation 3) includes peak 2944 corresponding to human target 114, and peak 2946 corresponding to the wall.

As shown by FIG. 29, the leakage peak is not present in the STM or LTM plots, as shown by locations 2922 and 2942.

As also shown by FIG. 29, the wall peak, which is present in the range FFT plot (peak 2906) and the LTM plot (peak 2946) is not present in the STM plot, as shown by location 2926. For example, FIG. 15 shows the I-Q plot at frame 79 for STM at location 2926. FIG. 16 shows the I-Q plot at frame 79 for LTM at peak 2946. As shown by FIGS. 15 and 16, the amount of movement exhibited by the wall is much smaller in the STM plot than in the LTM plot. Such smaller amount of movement results in an STM strength $M_{STM,r}$ that is lower than predetermined STM threshold $T_{M,STM}$, and, therefore, is not identified as a peak. The amount of movement exhibited by the wall in the LTM plot results in an LTM strength $M_{LTM,r}$ that is higher than predetermined LTM threshold $T_{M,LTM}$, and, therefore, is identified as a peak 2946.

As shown by FIGS. 13 and 14, the amount of movement exhibited by walking human 114 is enough to result in an STM strength $M_{STM,r}$ that is higher than predetermined STM threshold $T_{M,STM}$, and an LTM strength $M_{LTM,r}$ that is higher than predetermined LTM threshold $T_{M,LTM}$. Therefore, locations 2924 and 2944 are identified as peaks.

FIG. 29 also shows that peak 2944 is delayed with respect to peak 2924. Such delay is a consequence of the LTM plot being calculated with information from the previous W frames (as shown by Equation 3) while the STM plot is calculated with information from the current frame w (as shown by Equation 2).

As can be seen from FIG. 29, the output of step 314b is peak 2924, and the output of step 316b is peaks 2944 and 2946. It can also be seen from the range FFT amplitude plot of FIG. 29 that a conventional target detection method relying on amplitude peaks of the range FFT would have detected, e.g., 3 targets associated with peaks 2902, 2904, and 2906 (or, e.g., only 2 targets associated with peaks 1902 and 1906 and missing the peak 2904 which corresponds to walking human 114).

FIGS. 17-20 and 30 correspond to frame 96 of maps 1000, 1100, and 1200. At frame 96, human target 114 is walking towards millimeter-wave radar 102 and is located around 5 m from millimeter-wave radar 102.

Figure 30:
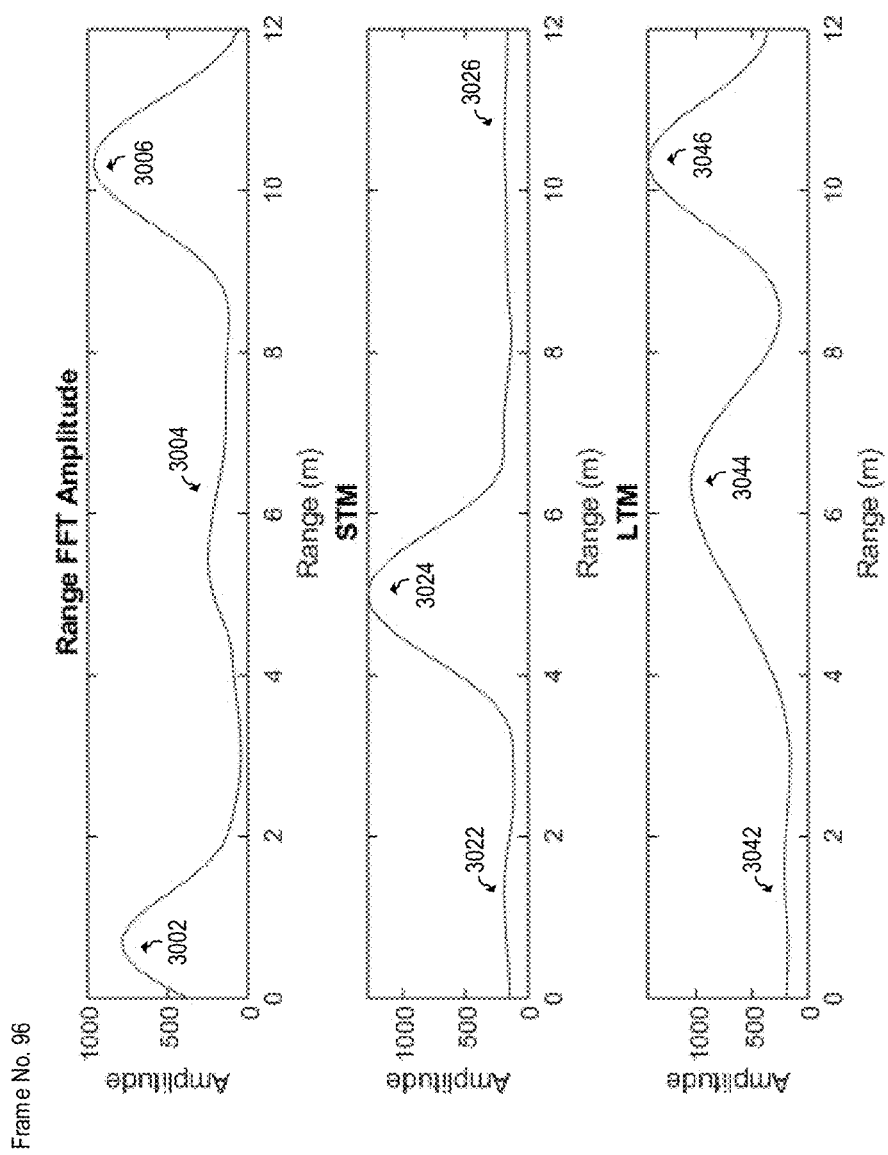

As shown by FIG. 30, the range FFT amplitude plot (which corresponds to FIG. 12) includes peak 3002 corresponding to RF leakage, peak 3004 corresponding to human target 114, and peak 3006 corresponding to the wall. The STM amplitude plot (which corresponds to FIG. 10 and is calculated using Equation 2) includes peak 3024 corresponding to human target 114. The LTM amplitude plot (which corresponds to FIG. 11 and is calculated using Equation 3) includes peak 3044 corresponding to human target 114, and peak 3046 corresponding to the wall.

As shown by FIG. 30 in locations 3022 and 3042 (and similar to FIG. 29), the leakage peak is not present in the STM or LTM plots.

Figure 19:
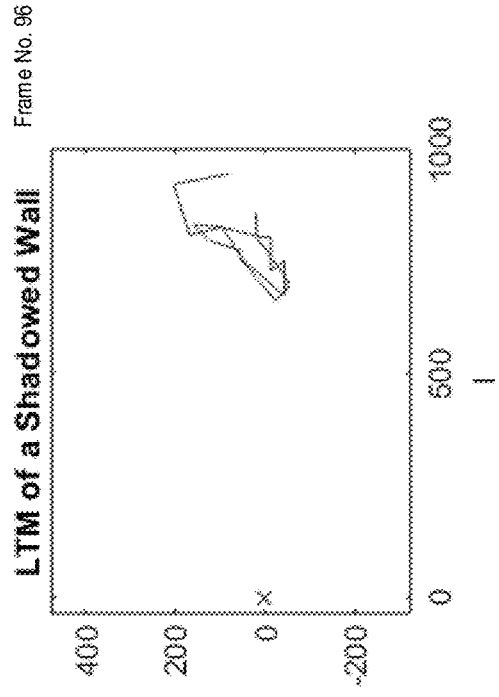
Figure 20:
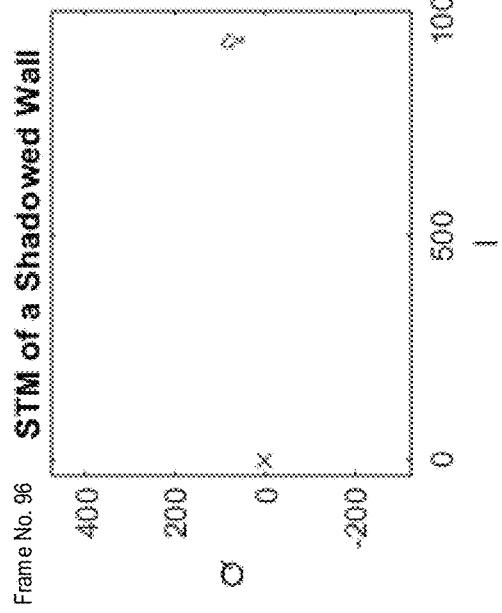

As also shown by FIG. 30, the wall peak, which is present in the range FFT plot (peak 3006) and the LTM plot (peak 3046) is not present in the STM plot, as shown by location 3026. For example, FIG. 19 shows the I-Q plot at frame 96 for STM at location 3026. FIG. 20 shows the I-Q plot at frame 96 for LTM at peak 3046. As shown by FIGS. 19 and 20, the amount of movement exhibited by the wall is much smaller in the STM plot than in the LTM plot. Such smaller amount of movement results in an STM strength $M_{STM,r}$ that is lower than predetermined STM threshold $T_{M,STM}$, and, therefore, is not identified as a peak. The amount of movement exhibited by the wall in the LTM plot results in an LTM strength $M_{LTM,r}$ that is higher than predetermined LTM threshold $T_{M,LTM}$, and, therefore, is identified as a peak 3046.

Figure 17:
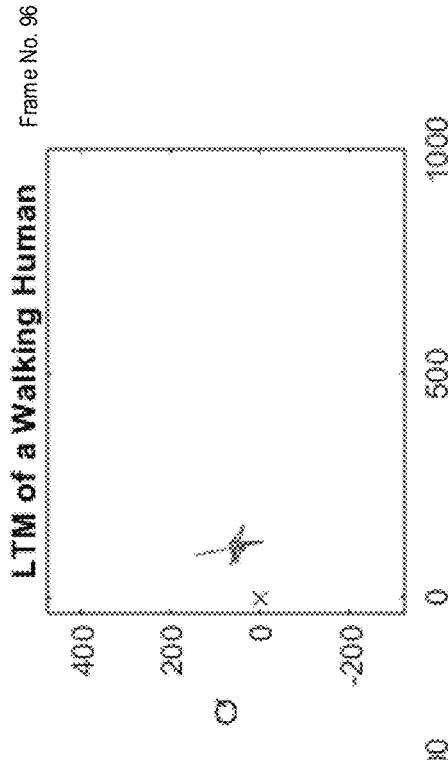
Figure 18:
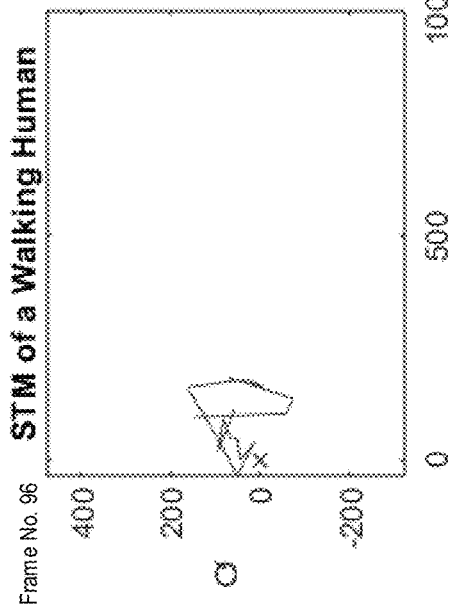

As shown by FIGS. 17 and 18, the amount of movement exhibited by walking human 114 is enough to result in an STM strength $M_{STM,r}$ that is higher than predetermined STM threshold $T_{M,STM}$, and an LTM strength $M_{LTM,r}$ that is higher than predetermined LTM threshold $T_{M,LTM}$. Therefore, locations 3024 and 3044 are identified as peaks. However, peak 3044 is delayed with respect to peak 3024. FIG. 30 also shows that peak 3004 is delayed with respect to peak 3024.

As can be seen from FIG. 30, the output of step 314b is peak 3024, and the output of step 316b is peaks 3044 and 3046. It can also be seen from the range FFT amplitude plot of FIG. 30 that a conventional target detection method relying on amplitude peaks of the range FFT would have detected, e.g., 3 targets associated with peaks 3002, 3004, and 3006, or failing to detect peak 3004.

FIGS. 21-24 and 31 correspond to frame 115 of maps 1000, 1100, and 1200. At frame 115, human target 114 is walking towards millimeter-wave radar 102 and is located around 3 m from millimeter-wave radar 102.

Figure 31:
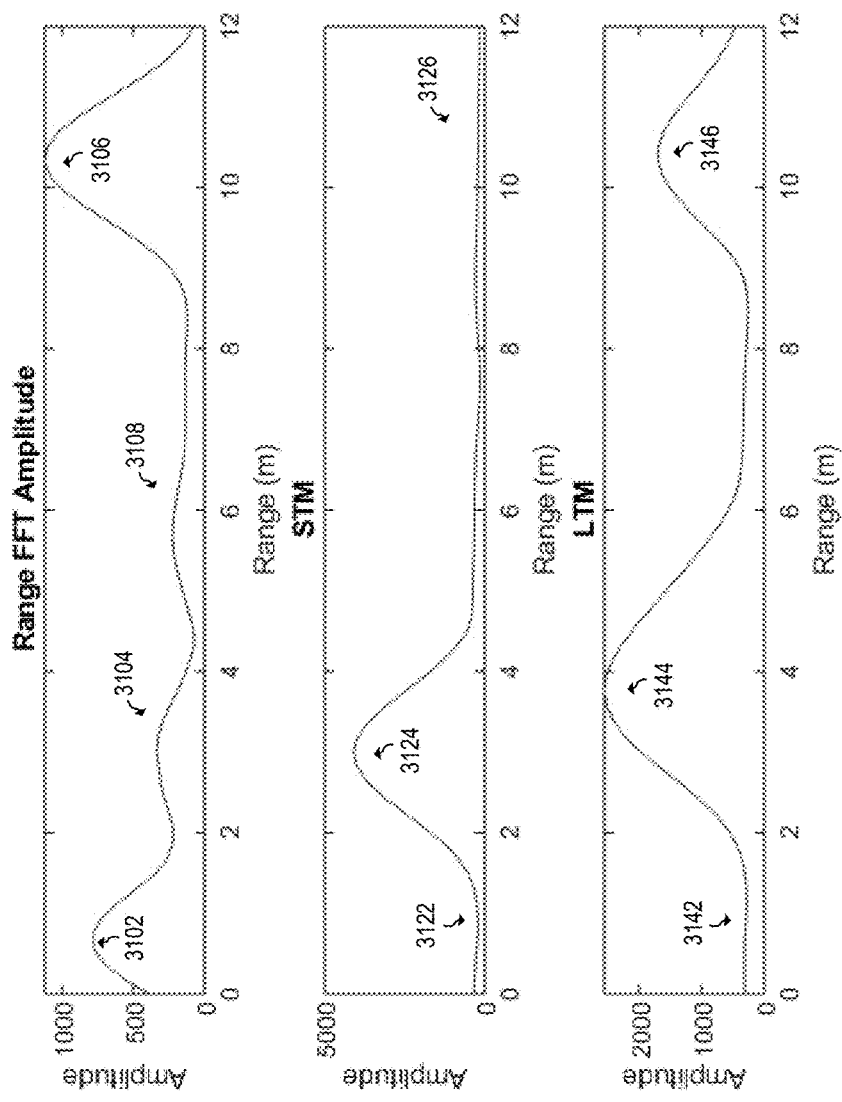

As shown by FIG. 31, the range FFT amplitude plot (which corresponds to FIG. 12) includes peak 3102 corresponding to RF leakage, peak 3104 corresponding to human target 114, peak 3106 corresponding to the wall, and peak 3108 corresponding to a ghost target. The STM amplitude plot (which corresponds to FIG. 10 and is calculated using Equation 2) includes peak 3124 corresponding to human target 114. The LTM amplitude plot (which corresponds to FIG. 11 and is calculated using Equation 3) includes peak 3144 corresponding to human target 114, and peak 3146 corresponding to the wall.

As shown by FIG. 31 in locations 3122 and 3142, the leakage peak is not present in the STM or LTM plots. As also shown by FIG. 31, peak 3108 associated with the ghost target in the range FFT amplitude plot is not present in the STM or LTM plots.

As also shown by FIG. 31, the wall peak, which is present in the range FFT plot (peak 3106) and the LTM plot (peak 3146) is not present in the STM plot, as shown by location 3126. For example, FIG. 23 shows the I-Q plot at frame 115 for STM at location 3126. FIG. 24 shows the I-Q plot at frame 115 for LTM at peak 3146. As shown by FIGS. 23 and 24, the amount of movement exhibited by the wall is much smaller in the STM plot than in the LTM plot. Such smaller amount of movement results in an STM strength $M_{STM,r}$ that is lower than predetermined STM threshold $T_{M,STM}$, and, therefore, is not identified as a peak. The amount of movement exhibited by the wall in the LTM plot results in an LTM strength $M_{LTM,r}$ that is higher than predetermined LTM threshold $T_{M,LTM}$, and, therefore, is identified as a peak 3146.

As shown by FIGS. 21 and 22, the amount of movement exhibited by walking human 114 is enough to result in an STM strength $M_{STM,r}$ that is higher than predetermined STM threshold $T_{M,STM}$, and an LTM strength $M_{LTM,r}$ that is higher than predetermined LTM threshold $T_{M,LTM}$. Therefore, locations 3124 and 3144 are identified as peaks. However, peak 3144 is delayed with respect to peak 3124.

As can be seen from FIG. 31, the output of step 314b is peak 3124, and the output of step 316b is peaks 3144 and 3146. It can also be seen from the range FFT amplitude plot of FIG. 31 that a conventional target detection method relying on amplitude peaks of the range FFT would have detected, e.g., 4 targets associated with peaks 3102, 3104, 3106 and 3108.

Figure 32:
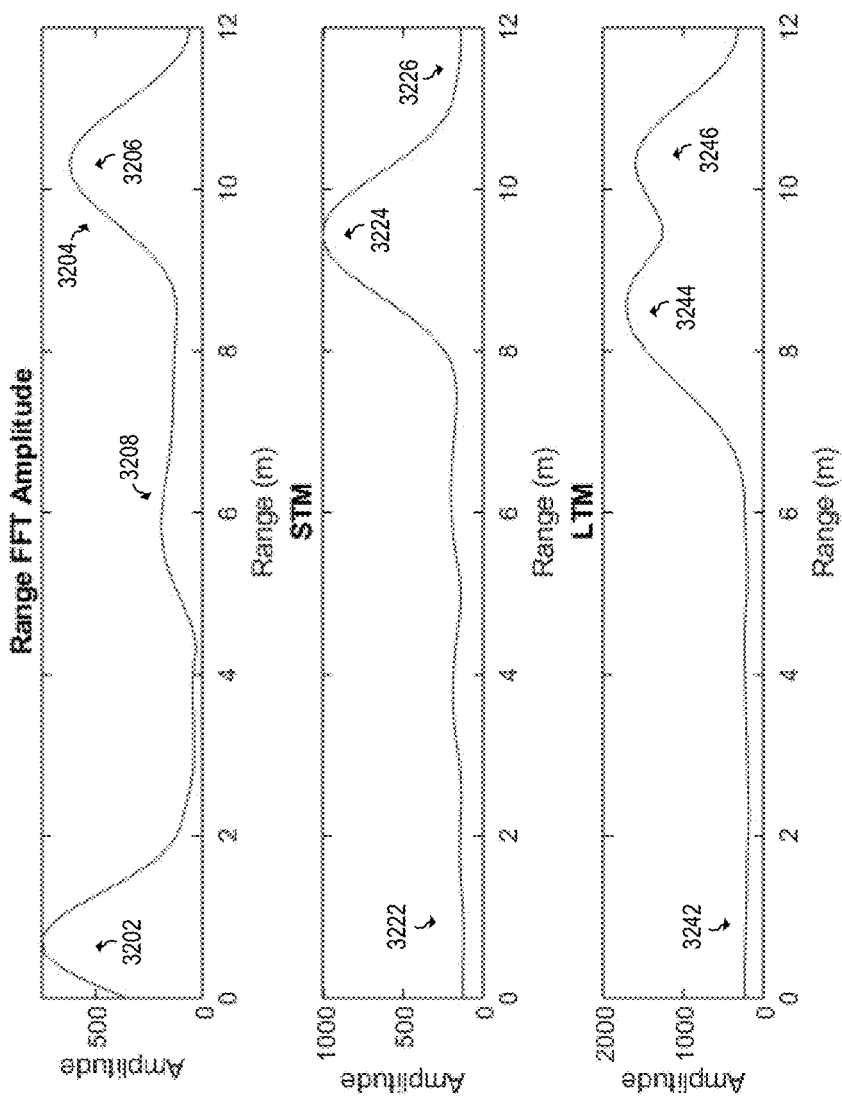

FIGS. 25-28 and 33 correspond to frame 253 of maps 1000, 1100, and 1200. At frame 253, human target 114 is near the wall and turning around to start walking away from the wall and towards millimeter-wave radar 102. FIGS. 32 and 34 correspond to frames 243 and 263, respectively, of maps 1000, 1100, and 1200.

Figure 33:
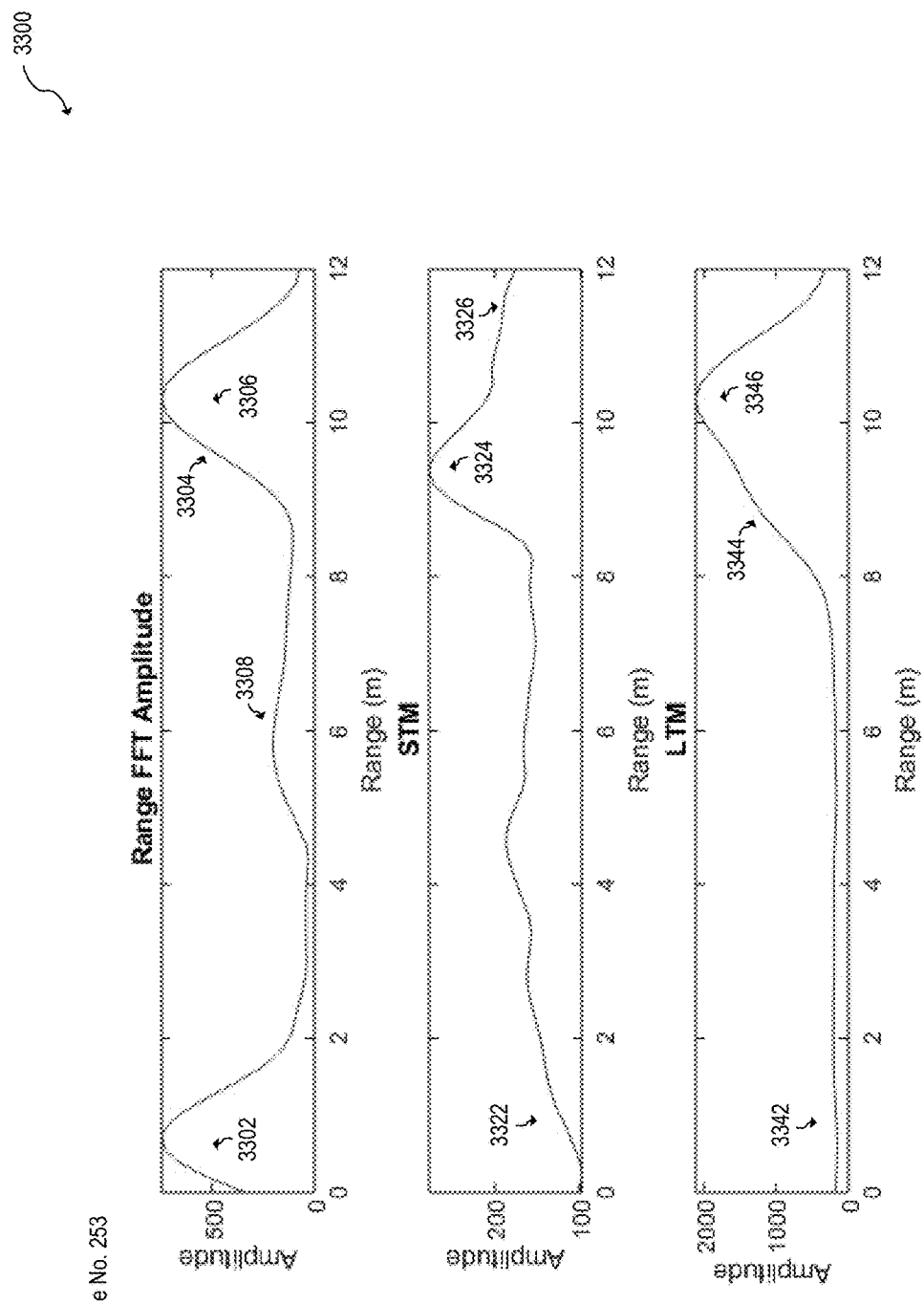
Figure 34:
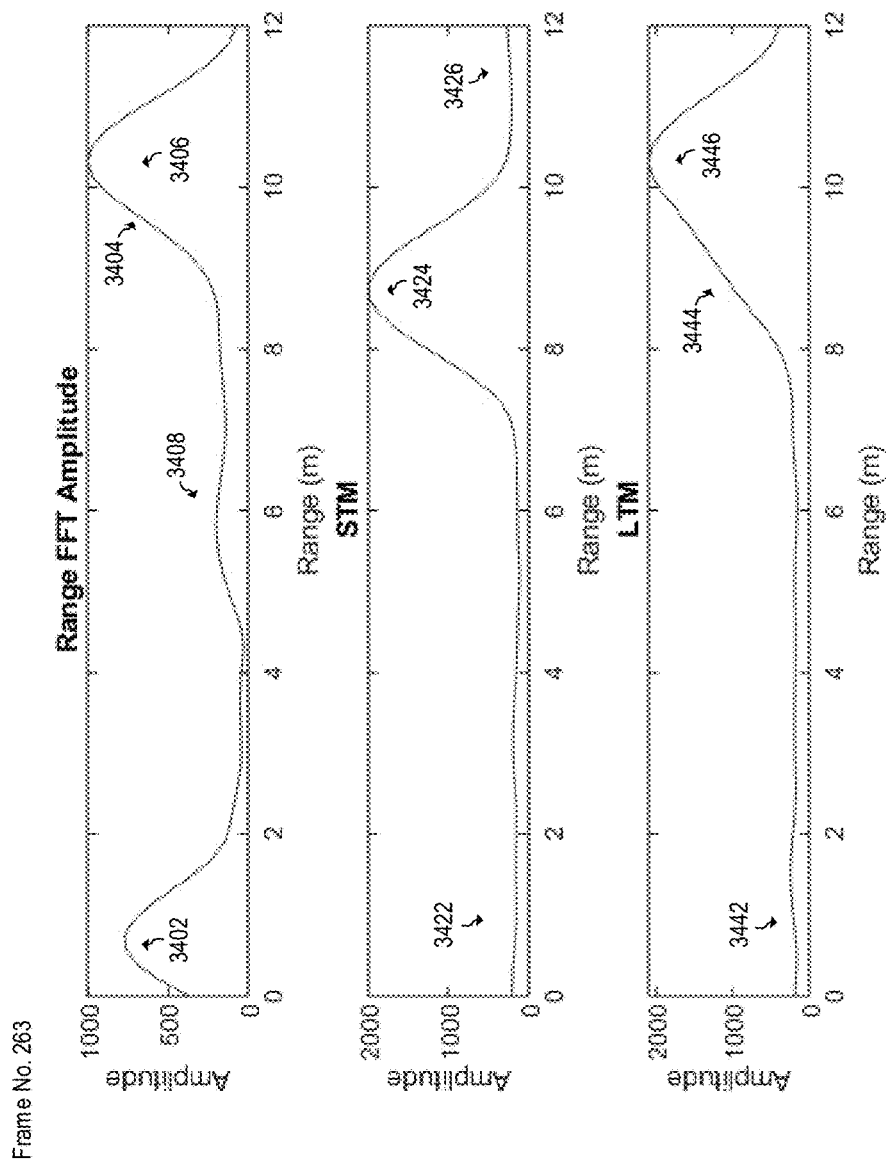

As shown by FIG. 33, the range FFT amplitude plot (which corresponds to FIG. 12) includes peak 3302 corresponding to RF leakage, and peak 3308 corresponding to a ghost target. The range FFT amplitude plot also includes peak 3306 corresponding to the wall, which shadows peaks 3304 corresponding to human target 114.

The STM amplitude plot (which corresponds to FIG. 10 and is calculated using Equation 2) includes peak 3324 corresponding to human target 114. The LTM amplitude plot (which corresponds to FIG. 11 and is calculated using Equation 3) includes peak 3346 corresponding to the wall, which shadows peak 3344 corresponding to human target 114.

As shown by FIG. 33 in locations 3322 and 3342, the leakage peak is not present in the STM or LTM plots. As also shown by FIG. 33, peak 3308 associated with the ghost target in the range FFT amplitude plot is not present in the STM or LTM plots.

As also shown by FIG. 33, the wall peak, which is present in the range FFT plot (peak 3306) and the LTM plot (peak 3346) is not present in the STM plot, as shown by location 3326. For example, FIG. 27 shows the I-Q plot at frame 253 for STM at location 3326. FIG. 28 shows the I-Q plot at frame 253 for LTM at peak 3346. As shown by FIGS. 27 and 28, the amount of movement exhibited by the wall is much smaller in the STM plot than in the LTM plot. Such smaller amount of movement results in an STM strength $M_{STM,r}$ that is lower than predetermined STM threshold $T_{M,STM}$, and, therefore, is not identified as a peak. The amount of movement exhibited by the wall in the LTM plot results in an LTM strength $M_{LTM,r}$ that is higher than predetermined LTM threshold $T_{M,LTM}$, and, therefore, is identified as a peak 3346.

As shown by FIG. 26, the amount of movement exhibited by walking human 114 is enough to result in an LTM strength $M_{LTM,r}$ that is higher than predetermined LTM threshold $T_{M,LTM}$. However, as shown by FIG. 33, peak 3344, is shadowed by peak 3346 and only peak 3346 is detected (since peak 3346 is the local maxima).

As shown by FIG. 25, the amount of movement exhibited by walking human 114 is not enough to result in an STM strength $M_{STM,r}$ that is higher than predetermined STM threshold $T_{M,STM}$. Therefore, peak 3322 is not identified as a peak.

As can be seen from FIGS. 32-34, peak 3324 is smaller than peaks 3224 and 3424 because the human target was not radially moving in frame 3324, but turning around. It is thus possible that in some embodiments (e.g., in which the STM threshold $T_{M,STM}$ is above 300), the output of step 314b is 0 peaks (no peaks are detected during step 314b for frame 253), and the output of step 316b is peak 3346. It can also be seen from the range FFT amplitude plot of FIG. 33 that a conventional target detection method relying on amplitude peaks of the range FFT would have detected, e.g., 3 targets associated with peaks 3302, 3306, and 3308.

As will be explained in more detail later, failing to identify peak 3324 does not result in the killing of the track tracking human target 114. For example, as shown by FIG. 32 (corresponding to frame 243), the STM plot has peak 3224, which is detected as a peak in step 314b. FIG. 32 also shows that the LTM plot has peak 3244, which is detected as a peak in step 316b. Therefore, when peak 3324 of the STM plot is not detected in frame 253, the peak 3346 of the LTM plot is associated with the target because of its proximity to peak 3244 of frame 243. As a result, the condition STM==0 & LTM==1 is met, causing human target 114 to move from moving state 406 into unsure state 404 and remain in unsure state until the counter C expires (or a new corresponding STM peak is detected), as shown by FIGS. 8B and 8C. In some embodiments, even when no LTM peak is associated with the track, human target 114 moves from moving state 406 into unsure state 404 since, as shown in FIG. 8C, the condition LTM==X is met.

If counter C expires before an STM peak is detected, the condition STM==0 is met, causing human target 114 to move from unsure state 404 into static state 408 if the condition LTM==1 (as shown w by FIG. 8B), since the track was activated (A==1) when human target 114 transitioned into moving state 406, as shown by FIG. 8D. Once in static state 408, the track tracking human target is not killed while an LTM peak is detected, as shown by FIG. 8D. As shown in FIG. 8B, if the counter expires when the conditions STM==0 and LTM==0 are met, then the track is killed.

As shown by FIG. 34 (corresponding to frame 263), the STM plot has peak 3424, which is detected as a peak in step 314b. FIG. 34 also shows that the LTM plot has peak 3446, which is detected as a peak in step 316b because of its proximity to peak 3346. Therefore, the condition STM==1 is met and human target 114 transitions from static state 408 into unsure state 404 based on counter C (as shown by FIG. 8D), and then transitions from unsure state 404 into moving state 406 based on counter C (as shown by FIG. 8B).

Figure 35:
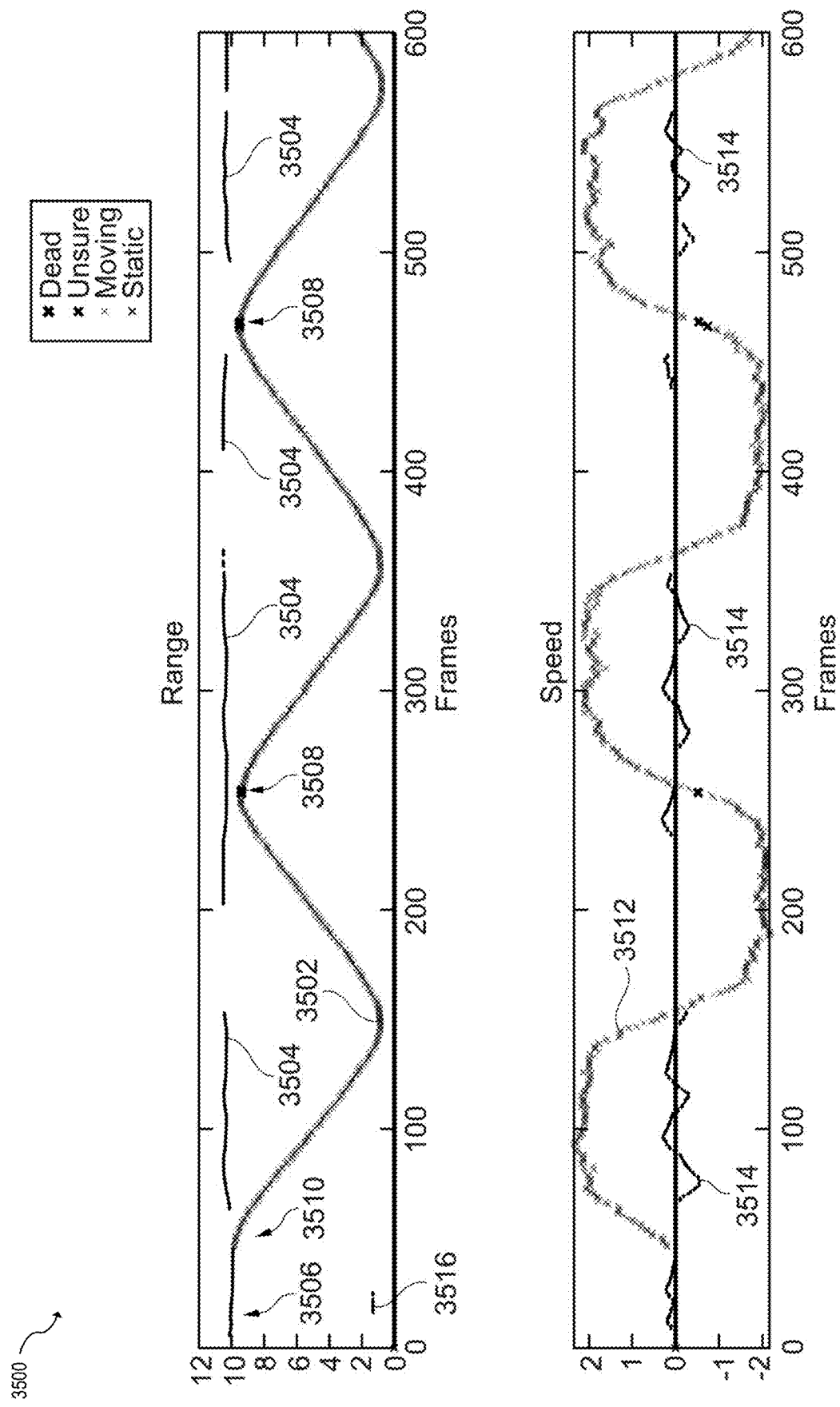
FIGS. 35-37 show plots of the output of the range and velocity generation step of the method of FIG. 6 when tracking the walking human as captured in FIGS. 10 and 11, according to an embodiment of the present invention.
Figure 36:
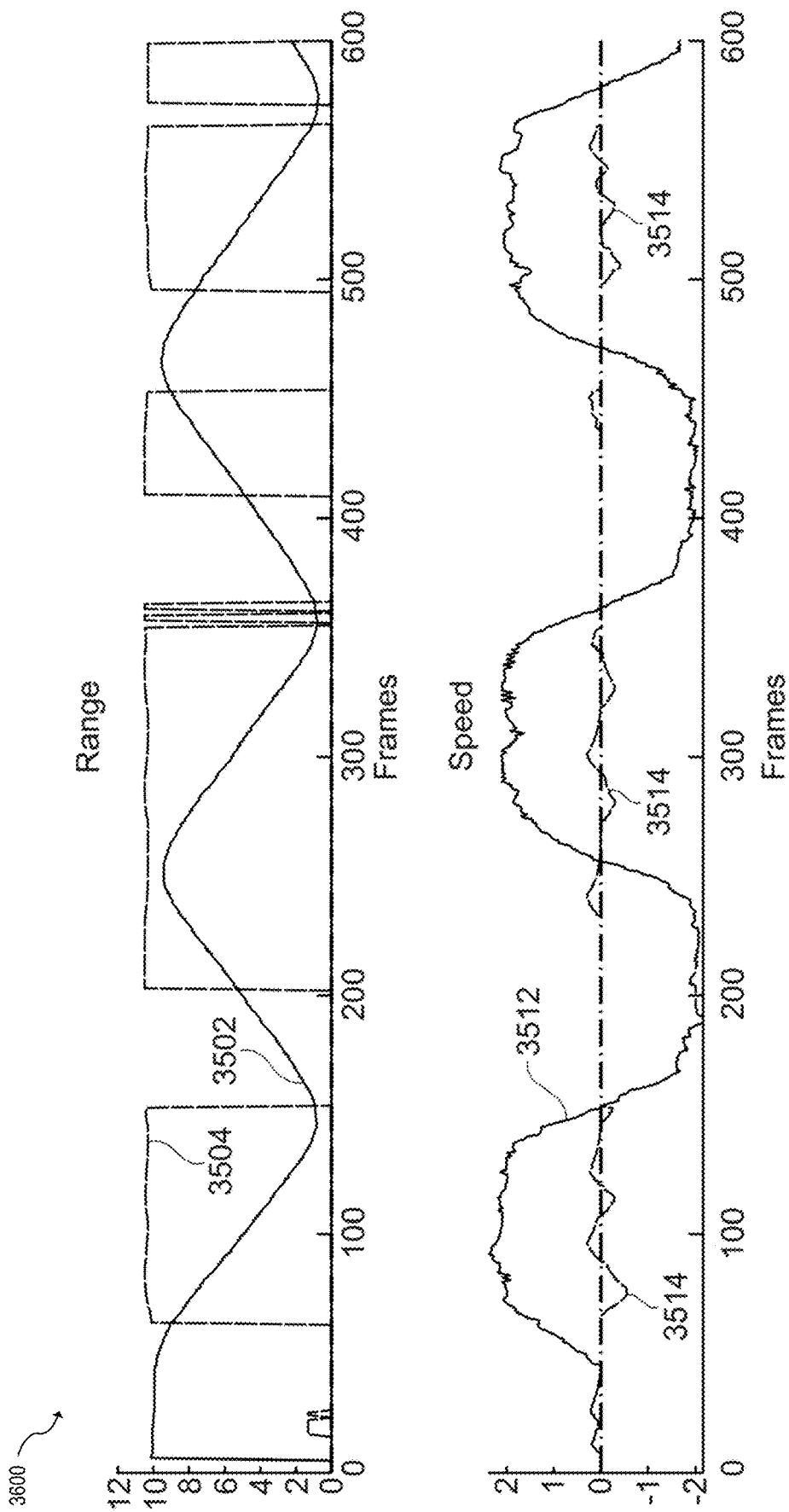
Figure 37:

FIGS. 35-37 show plots 3500, 3600, and 3700, respectively of the output of step 620 for each track for the walking human 114 as captured in FIGS. 10 and 11, according to an embodiment of the present invention. Plot 3500 also shows the state of the target (712) while plot 3600 illustrates the tracks by their Track ID (702).

As shown by FIGS. 35-37, track 3502 corresponds to walking human 114. As can be seen in FIGS. 35 and 36, when walking human 114 is near the wall, a second track 3504 is generated for the wall. However, because the wall is a static object, it shows up in the LTM plot but not in the STM plots. As a result, track 3504 is never activated and is killed once the timer expires (steps 534 and 526). Noise that may be initially tracked as a potential target (such as shown by track 3516), is similarly never activated and is killed once the timer expires (steps 534 and 526).

As shown by FIG. 35, track 3502 is initially in the unsure state 404 (as shown by location 3506). However, after transitioning into moving state 406 at location 3510, it goes into unsure state 404 at locations 3508 when walking human 114 is turning around. However, track 3502 is not killed.

FIGS. 35-37 also show the velocity of tracks 3502 and 3504 with curves 3512 and 3514, respectively.

Plot 3700 is similar to plot 3600. However, plot 3700 only illustrates activated tracks. Since track 3504 never transitioned to moving state 406, it was not activated.

Figure 38:
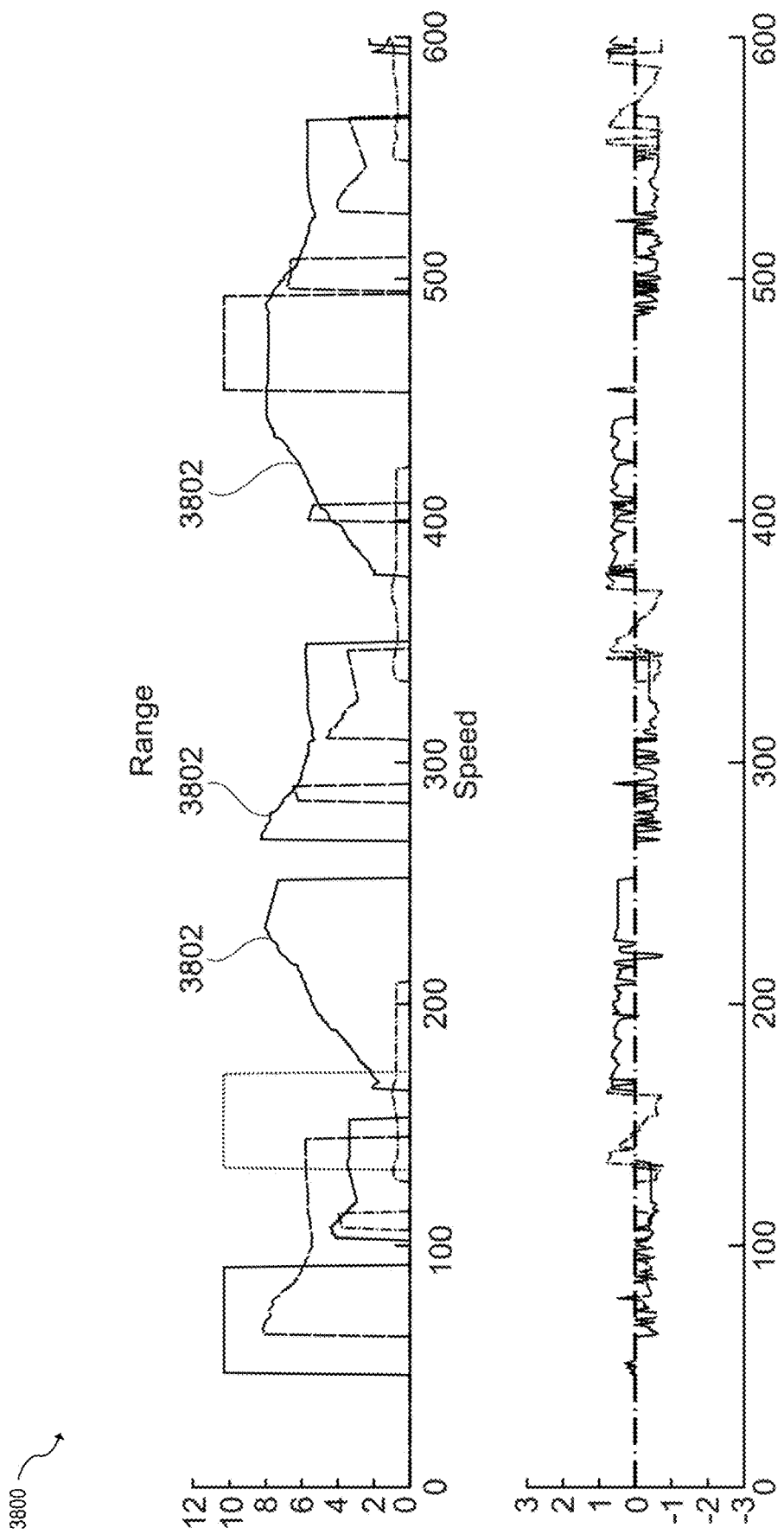
FIG. 38 shows a plot illustrating conventional tracking of the walking human shown in FIGS. 35-37, where the plot is generated by identifying targets based on peaks of the range FFT amplitude plot and where the velocity of the target is determined using the Doppler FFT.

FIG. 38 shows plot 3800 illustrating conventional tracking of the walking human shown in FIGS. 35-37, where the plot is generated by identifying targets based on peaks of the range FFT amplitude plot (as shown in FIGS. 29-34) and where the velocity of the target is determined using the Doppler FFT.

As shown in FIG. 38, conventional tracking results in ghost targets being tracked and may result in target splitting for higher target velocities.

As shown by FIG. 37, some embodiments advantageously avoid target splitting and tracking ghost target by relying on STM peaks for target identification. Additional advantages of some embodiments include improved velocity estimation, e.g., as shown by FIG. 37 when compared with FIG. 38.

Advantages of some embodiments include avoiding tracking static objects, such as walls or furniture by activating a track only after an initial movement is detected for a minimum period of time. By performing a time-domain based investigation of the complex range FFT output instead of performing a peak search in the range FFT amplitude and by performing velocity determination using time-domain based investigation instead of using Doppler FFT, some embodiments advantageously achieve successful target tracking and improved range and velocity estimation with a lower computational effort than conventional tracking using conventional range and speed estimation methods, such as peak search in range FFT amplitude, and Doppler FFT, respectively.

Additional advantages of some embodiments include achieving a smooth measurement data by using an alpha-beta filtering (e.g., such as Equations 5 and 6) and/or median filtering of the tracking outputs (range and/or velocity).

Figure 39:
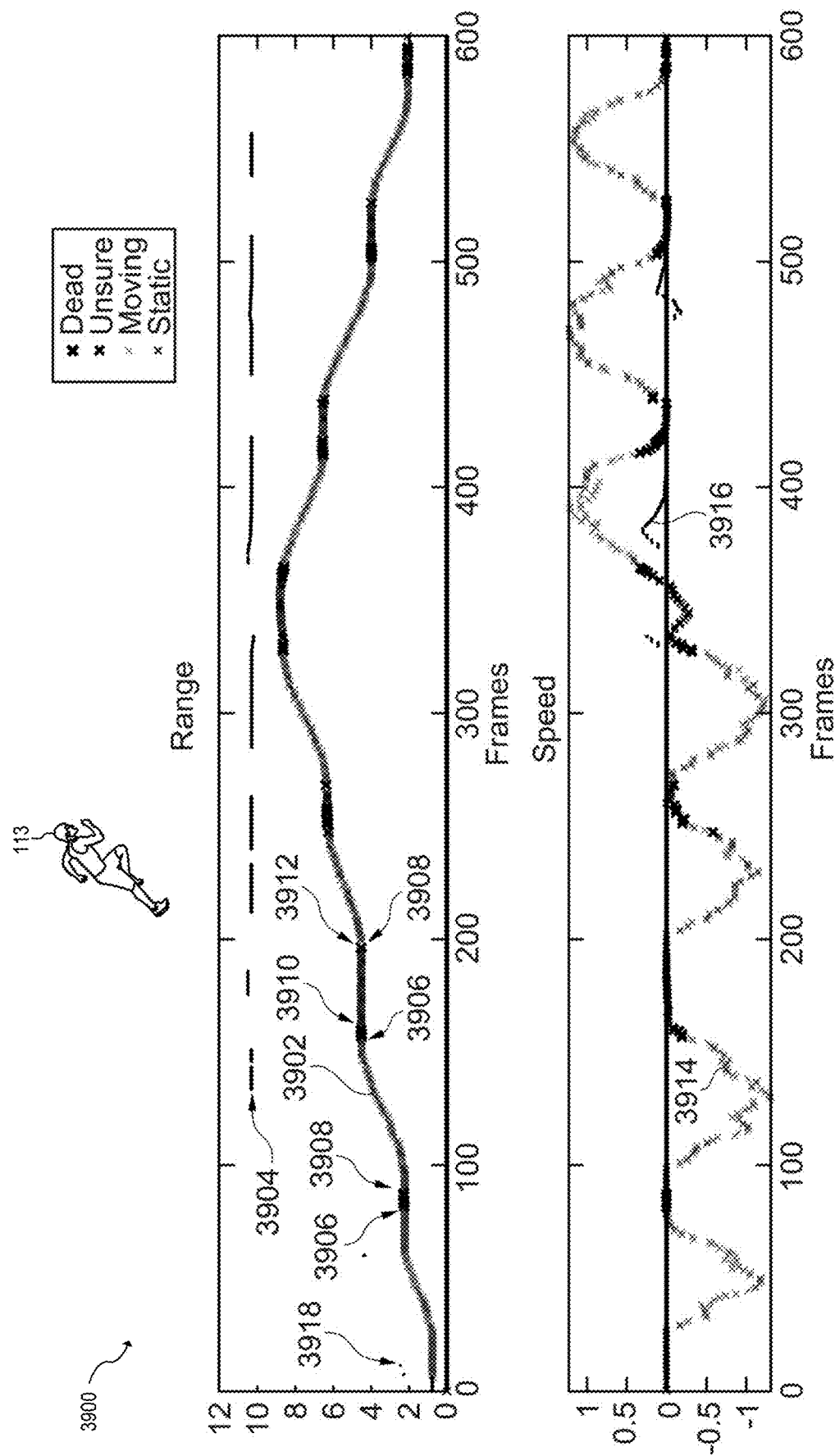
FIGS. 39-41 show plots of the output of the range and velocity generation step of the method of FIG. 6 when tracking a walking human walking away and towards the millimeter-wave radar of FIG. 1 in a step-wise manner, according to an embodiment of the present invention.
Figure 40:
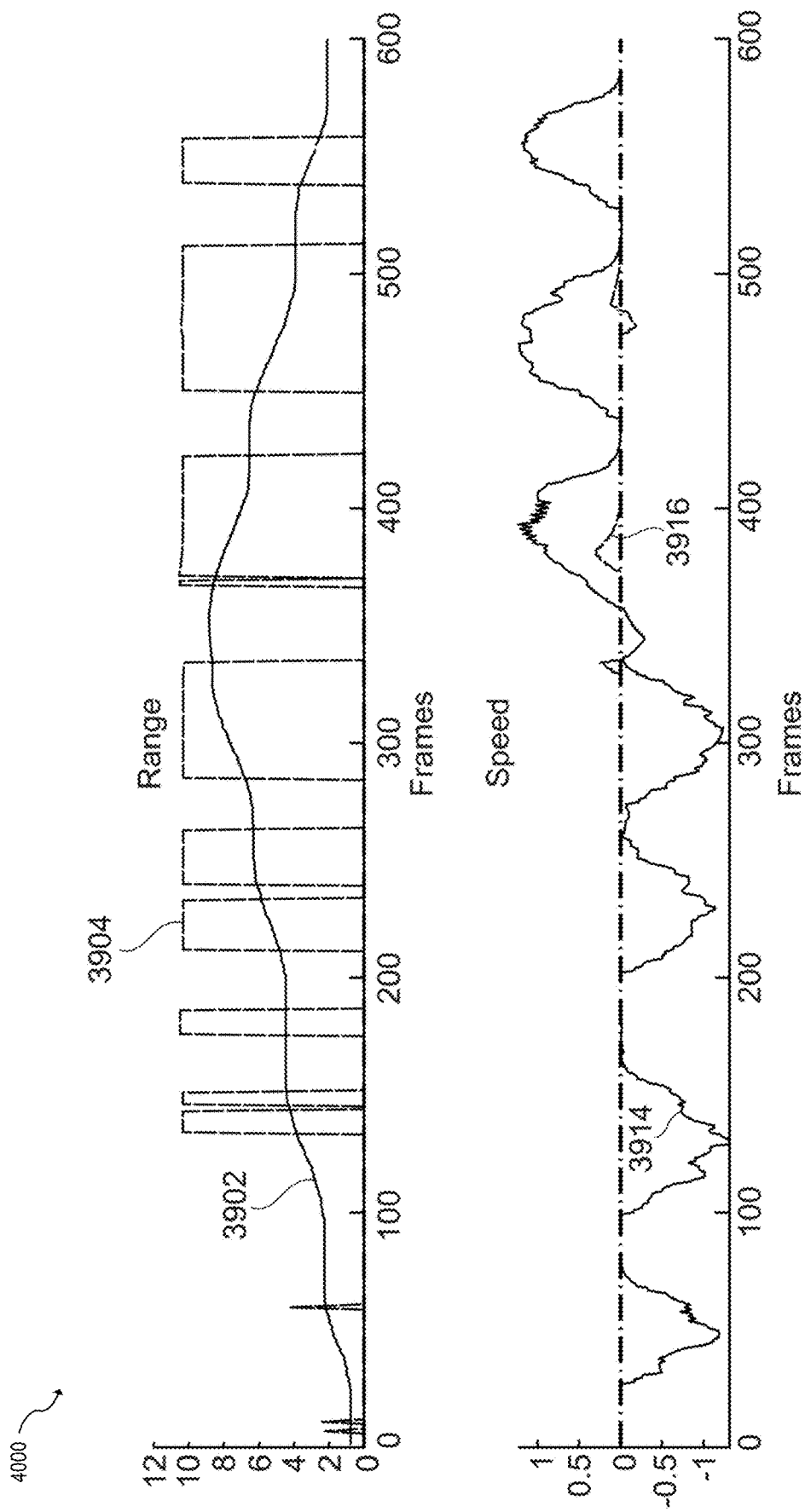
Figure 41:
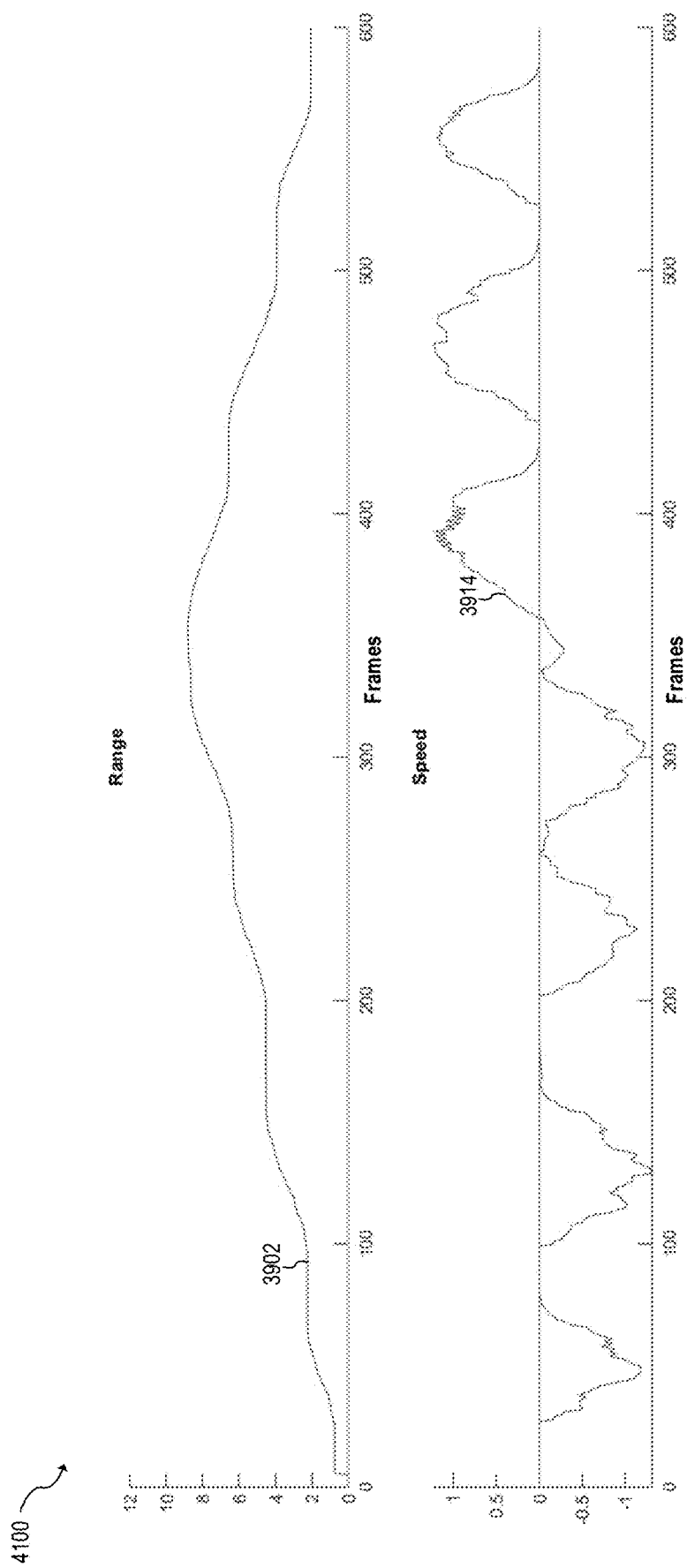

FIGS. 39-41 show plots 3900, 4000, and 4100, respectively, of the output of step 620 (tracked by track ID 702) when tracking walking human 113 walking away and towards millimeter-wave radar 102 in a step-wise manner, according to an embodiment of the present invention. Plot 3900 also shows the state of the target (712) while plot 4000 illustrates the tracks by their Track ID (702). Plot 4100 is similar to plot 4000. However, plot 4100 only illustrates activated tracks.

As shown by FIGS. 39-41, track 3902 corresponds to walking human 113. As can be seen in FIG. 39, when walking human 113 stops, the target state (712) transitions from moving state 402 into unsure state 404 (as shown, e.g., by locations 3906). If walking human 113 stops for a long time, the target state transitions from unsure state 404 into static state 408, as shown, e.g., by locations 3910. When walking human 113 resumes walking, the target state transitions from static state 408 into unsure state 404, and then from unsure state 404 into moving state 406, as shown by locations 3912 and 3908, respectively.

As shown by FIGS. 39 and 41, even though the wall occasionally becomes a potential target (in unsure state 404), as shown by potential track 3904, such track is not activated and is eventually killed. Similarly, even though noise may become a potential track (such as shown by potential track 3938), such track is not activated and is eventually killed.

FIGS. 39-41 also show the velocity of tracks 3902 and 3904 with curves 3914 and 3916, respectively.

Some embodiments may implement frame skipping mode. In frame skipping mode, one or more frames are skipped, e.g., during transmission of chirps (e.g., in step 302). For example, in some embodiments, when the frame skipping is set to 4, frame 1 is transmitted, and then no other frame is transmitted until frame 5. In other embodiments, frame skipping is performed virtually, in which all frames are transmitted by millimeter-wave radar 102, but some frames are skipped and not processed, e.g., to detect and track targets. For example, in some embodiments, when the frame skipping is set to 4, all frames are transmitted by millimeter-wave radar 102, but only 1 in every 4 frames are processed. By only processing a subset of frames, some embodiments achieve power savings (e.g., by increasing the idle time of the processor).

Other than the frame skipping, all other operations remain the same as when not using frame skipping mode. For example, if the frame time FT is 50 ms without frame skipping, the frame time FT with a frame skipping of 4 is 200 ms. With respect to Equation 3, w refers to actual frames used during the generation of range data (in step 310) and not does not refer to the skipped frames.

Figure 42:
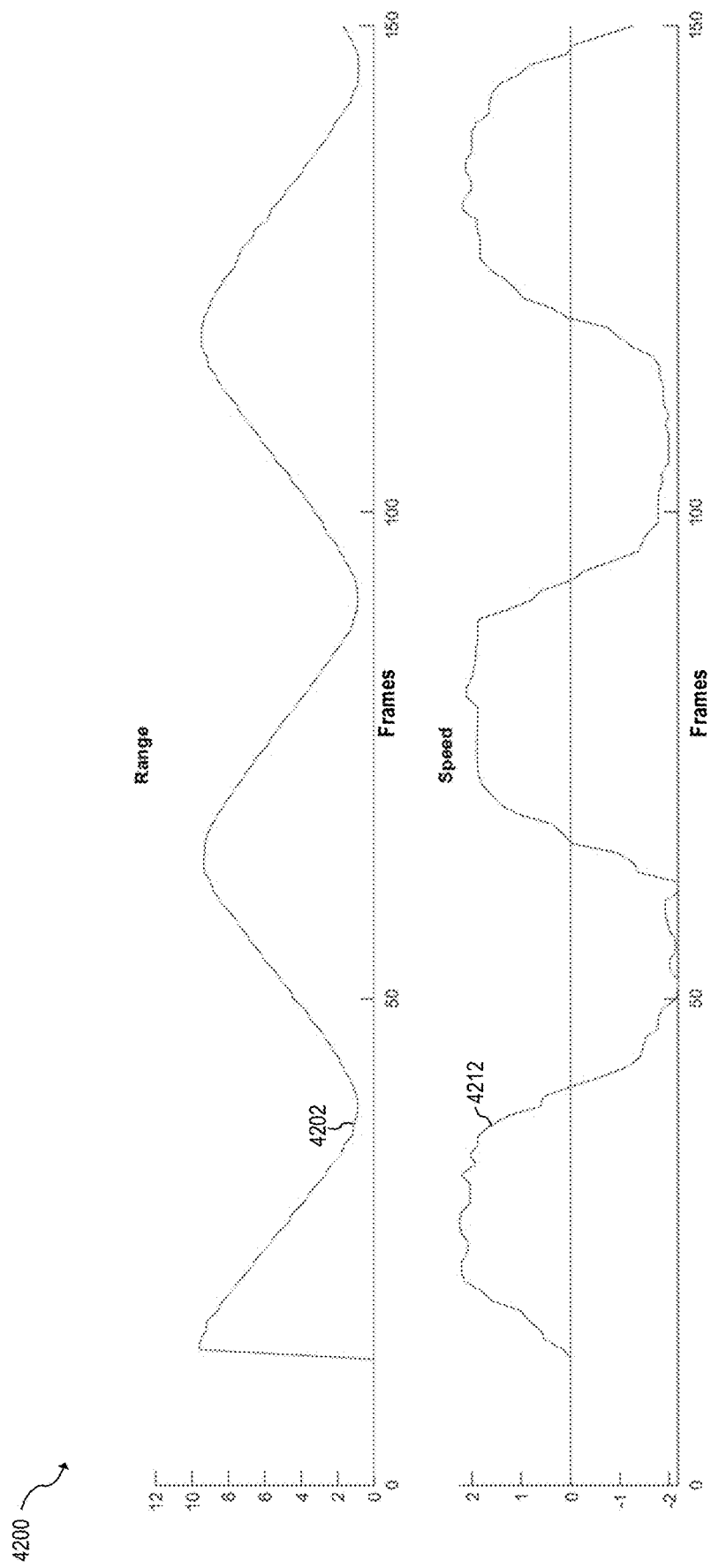
FIG. 42 shows a plot of the output of the range and velocity generation step of the method of FIG. 6 when tracking a walking human using frame skipping mode, according to an embodiment of the present invention.

Some embodiments may advantageously achieve power savings when using frame skipping mode without substantially degrading performance. For example, FIG. 42 shows plot 4200 of the output of step 620 when tracking walking human 114 as captured in FIGS. 10 and 11, using frame skipping mode, according to an embodiment of the present invention. In the embodiment of FIG. 42, frame skipping is set to 4. Plot 4200 shows only activated tracks. The data illustrated in FIG. 42 was generated virtually from the same data used to generate FIGS. 35-38 (by only using one in every four frames so that the frame time FT is 200 ms).

As shown by FIG. 42, only 150 frames are shown instead of the 600 frames shown in FIG. 37 since frame skipping is set to 4. As shown by FIG. 42, track 4202 tracks walking target 114, although slightly delayed when compared with track 3902 of FIG. 37. The velocity of walking target 114 is also tracked successfully, as shown by curve 4212. As also shown by FIG. 42, no ghost targets or static objects such as the wall is tracked with an active track.

Some embodiments may implement low power mode. In low power mode, each frame only includes a single chirp. Therefore, STM peaks, which are identified using Equation 2 based on a plurality of chirps per frame, are not used during low power mode. Instead, an STM peak is identified in low power mode (STM=1) when the velocity $S_w$ is greater than a predetermined velocity threshold $S_{min}$. Some embodiments, therefore, may use state machine 400 when operating in low power mode.

Figure 43:
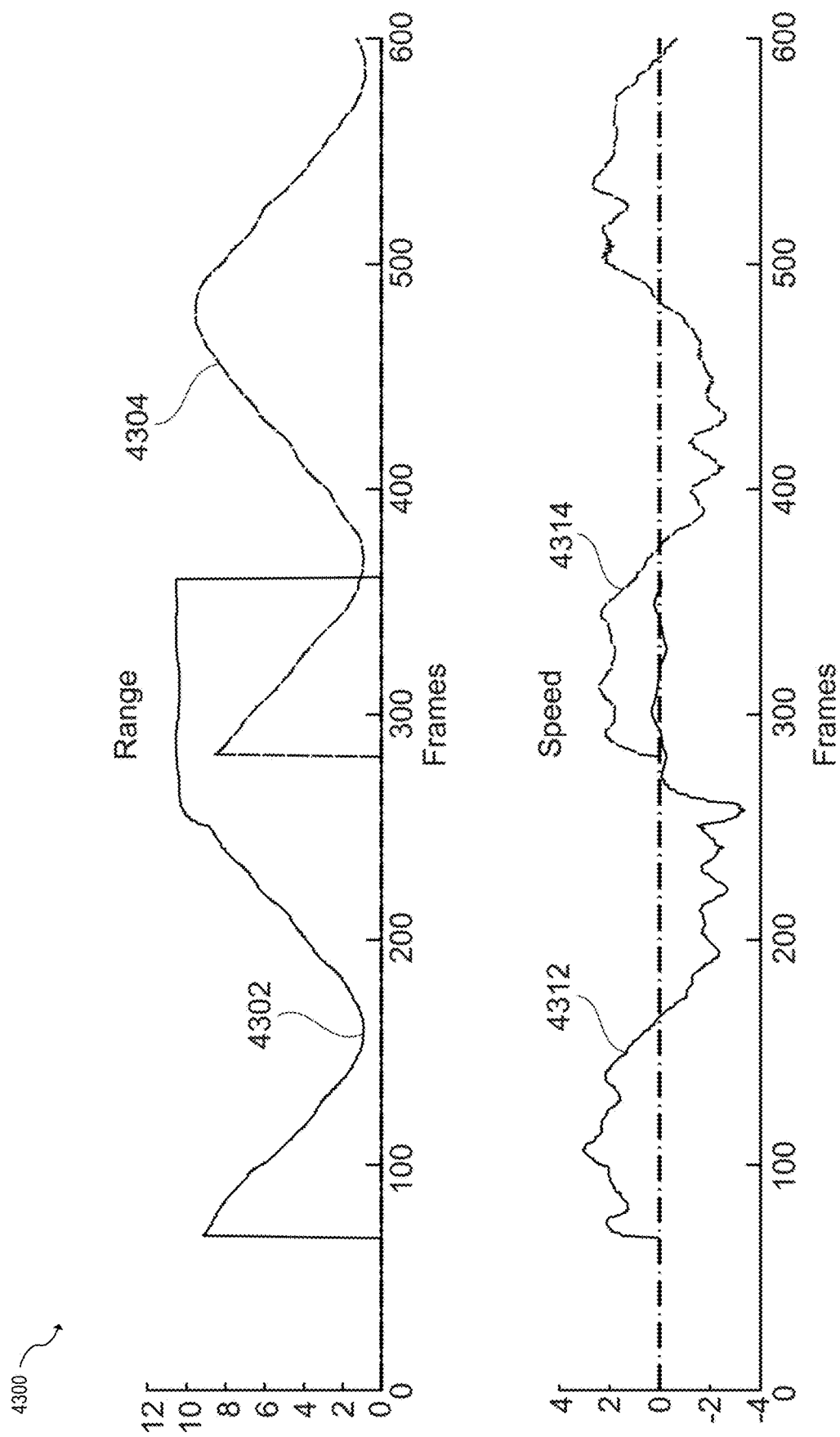
FIG. 43 shows a plot of the output of the range and velocity generation step of the method of FIG. 6 when tracking a walking human using low power mode, according to an embodiment of the present invention.

Some embodiments may advantageously achieve power savings when using low power mode. FIG. 43 shows plot 4300 of the output of step 620 when tracking walking human 114 as captured in FIG. 11, using low power mode, according to an embodiment of the present invention. Plot 4300 shows only activated tracks. Plot 4300 uses a frame time FT of 50 ms.

As shown by FIG. 43, tracks 4302 and 4304 track walking target 114, although a target splitting occurs when walking target is near the wall (around frame 253). The velocity of walking target 114 is also tracked successfully, although also exhibiting target splitting, as shown by curves 4312 and 4314. In some embodiments, other than increased susceptibility to target splitting, low power mode advantageously avoids tracking ghost targets and static objects with an activated track.

Some embodiments may avoid target splitting and increase performance in low power mode (thus resulting in a single activated track) by limiting the number of activated tracks that are output during low power mode to a single activated track and associating the closest target to the activated track. For example, some embodiments may generate more than one activated track during low power mode, however, only the activated track that is closest to millimeter-wave radar 102 is output during low power mode.

Figure 44:
FIGS. 44 and 45 show plots of the output of the range and velocity generation step of the method of FIG. 6 when tracking a walking human using low power mode and frame skipping mode, according to embodiments of the present invention.

FIG. 44 shows plot 4400 of the output of step 620 when tracking walking human 114 as captured in FIGS. 10 and 11, using low power mode and frame skipping, according to an embodiment of the present invention. In the embodiment of FIG. 44, frame skipping is set to 4. Plot 4400 shows only activated tracks.

Plot 4400 uses a frame time FT of 200 ms and was generated virtually from the same data used to generate plot 4300 (by only using one in every four frames).

As shown by FIG. 44, and similarly to FIG. 42, only 150 frames are shown since frame skipping is set to 4. As shown by FIG. 44, track 4402 tracks walking target 114. The velocity of walking target 114 is also tracked successfully, as shown by curve 4412. As also shown by FIG. 44, no ghost targets or static objects such as the wall is tracked with an active track.

As can be seen in FIG. 44, target splitting is advantageously avoided even though low power mode is used by limiting the number of tracks to 1 and by associating to the single track the closest target detected.

Figure 45:
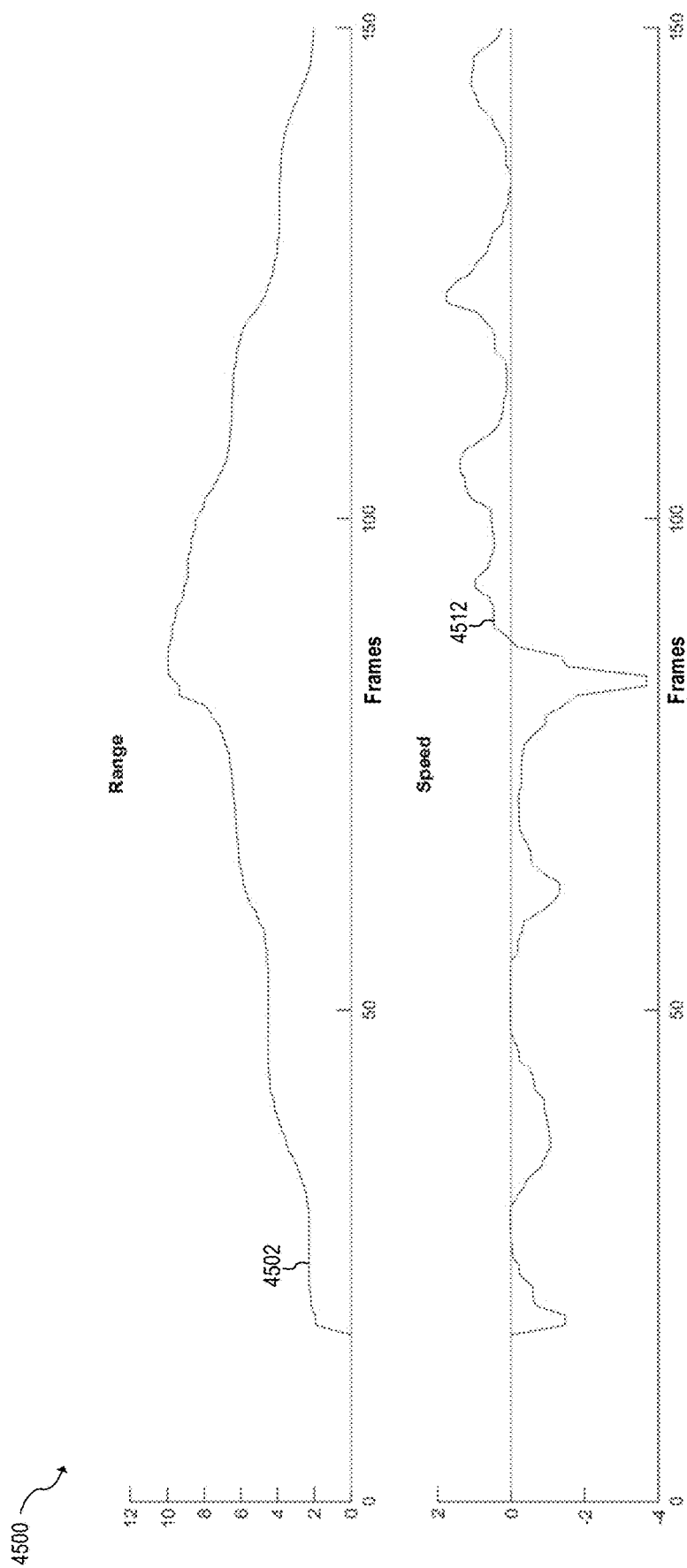

FIG. 45 shows plot 4500 of the output of step 620 when tracking human 113 walking away and towards millimeter-wave radar 102 in a step-wise manner, using low power mode and frame skipping, according to an embodiment of the present invention. In the embodiment of FIG. 45, frame skipping is set to 4. Plot 4500 shows only activated tracks. Plot 4500 was generated virtually from the same data used to generate FIGS. 39-41 (by only using one in every four frames so that the frame time FT is 200 ms).

As shown by FIG. 45, only 150 frames are shown since frame skipping is set to 4 instead of the 600 frames shown in FIG. 41. As shown by FIG. 45, track 4502 tracks walking target 113. The velocity of walking target 113 is also tracked successfully, as shown by curve 4512. As also shown by FIG. 45, no ghost targets or static objects such as the wall is tracked with an active track.

Although the performance of the range and velocity estimation without low power mode and frame skipping may be superior than using low power mode and frame skipping, in some embodiments, combining low power mode and frame skipping advantageously results in power savings while still successfully tracking the target and successfully performing range and velocity estimations.

Figure 46:
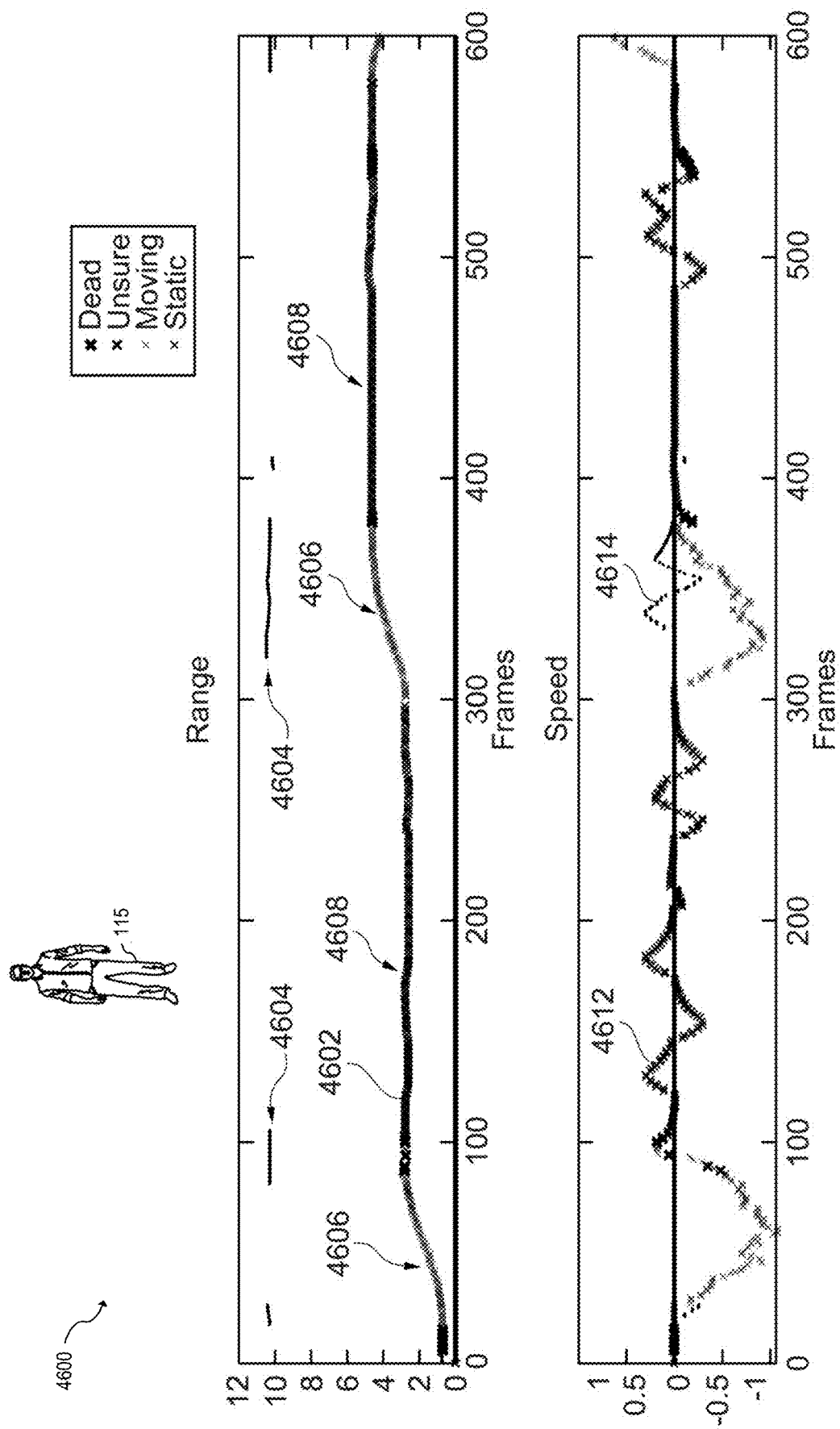
FIGS. 46-48 show plots of the output of the range and velocity generation step of the method of FIG. 6 when tracking a walking human walking away from the millimeter-wave radar of FIG. 1 in a step-wise manner, according to an embodiment of the present invention.
Figure 47:
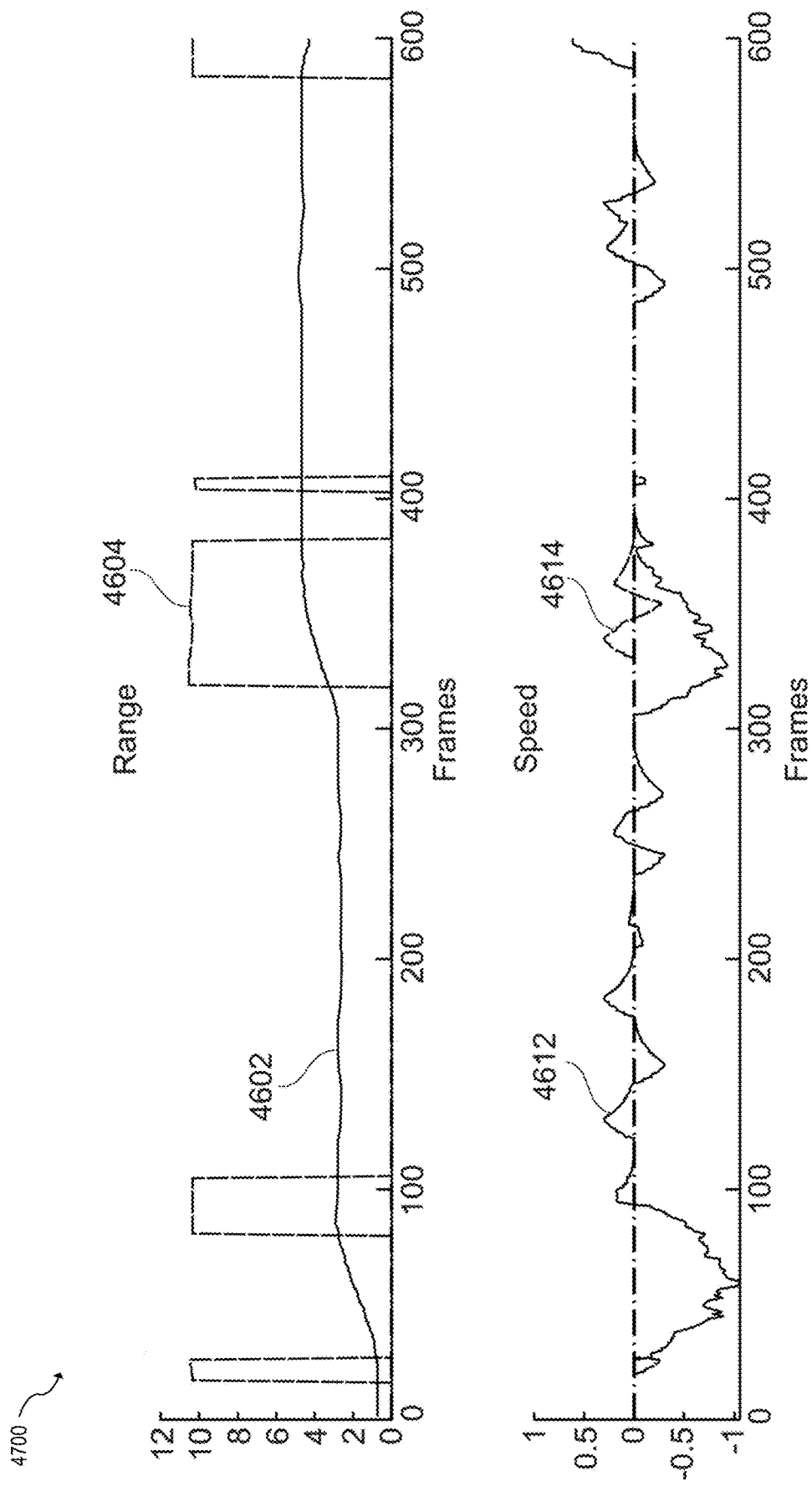
Figure 48:
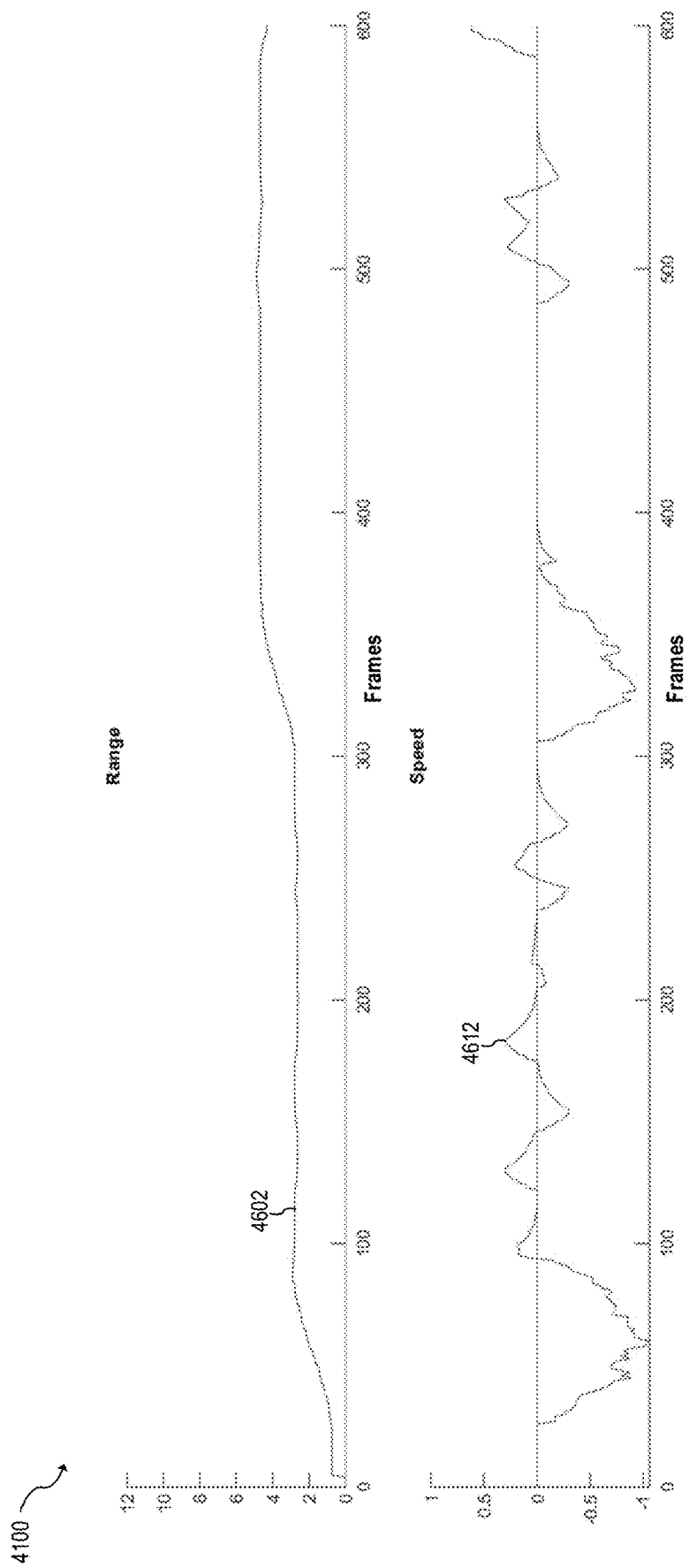

FIGS. 46-48 show plots 4600, 4700, and 4800, respectively, of the output of step 620 when tracking walking human 115 walking away from millimeter-wave radar 102 in a step-wise manner, according to an embodiment of the present invention. Plot 4600 also shows the state of the target (712) while plot 4700 illustrates the tracks by their Track ID (702). Plot 4800 is similar to plot 4700. However, plot 4800 only illustrates activated tracks.

As shown by FIGS. 46-48, track 4602 corresponds to walking human 115. As can be seen in FIG. 46, when walking human 115 stops, the target state (712) transitions into static state 408 and the track is not killed even though the target remains in static state 408 for long periods of times, as shown by locations 4608.

In some embodiments, when a human target remains in static state 408 for longer than a predetermined period of time (e.g., such as 10 frames), processor 104 may determine vital signs of such human target (such as heartbeat rate and/or respiration rate) while the target remains in static state 408. Processor 104 may stop monitoring the vital signs when the target transitions out of static state 408.

In some embodiments, the vital signs may be determined using millimeter-wave radar 102 in ways known in the art. In some embodiments, the vital signs may be determined using millimeter-wave radar 102 as described in co-pending U.S. patent application Ser. No. 16/794,904, filed Feb. 19, 2020, and entitled "Radar Vital Signal Tracking Using Kalman Filter," and/or co-pending U.S. patent application Ser. No. 16/853,011, filed Apr. 20, 2020, and entitled "Radar-Based Vital Sign Estimation," which applications are incorporated herein by reference.

Example embodiments of the present invention are summarized here. Other embodiments can also be understood from the entirety of the specification and the claims filed herein.

Example 1. A method including: receiving reflected radar signals with a millimeter-wave radar; performing a range discrete Fourier Transform (DFT) based on the reflected radar signals to generate in-phase (I) and quadrature (Q) signals for each range bin of a plurality of range bins; for each range bin of the plurality of range bins, determining a respective strength value based on changes of respective I and Q signals over time; performing a peak search across the plurality of range bins based on the respective strength values of each of the plurality of range bins to identify a peak range bin; and associating a target to the identified peak range bin.

Example 2. The method of example 1, where determining the respective strength value for each range bin based on changes of the respective I and Q signals over time includes determining the respective strength values for each range bin based on changes of the respective I and Q signals over a single frame.

Example 3. The method of one of examples 1 or 2, where determining the respective strength values for each range bin based on changes of the respective I and Q signals over the single frame includes determining the respective strength values for each range bin based on $$\sum_{c=1}^{PN-1} |R_{r,c+1} - R_{r,c}|,$$

where PN represents a number of chirps per frame, $R_{r,c+1}$ represents a value of range bin $R_r$ for chirp c+1, and $R_{r,c}$ represents a value of range bin $R_r$ for chirp c.

Example 4. The method of one of examples 1 to 3, where determining the respective strength value for each range bin based on changes of the respective I and Q signals over time includes determining the respective strength values for each range bin based on changes of the respective I and Q signals over a plurality of frames.

Example 5. The method of one of examples 1 to 4, where determining the respective strength values for each range bin based on changes of the respective I and Q signals over the plurality of frames includes determining the respective strength values for each range bin based on $$\sum_{w=1}^{W-1} |R_{r,i,w+1} - R_{r,i,w}|,$$

where W represents a number of frames, $R_{r,i,w+1}$ represents a value of range bin $R_r$ for chirp i of frame w+1, and $R_{r,i,w}$ represents a value of range bin $R_r$ for chirp i of frame w.

Example 6. The method of one of examples 1 to 5, where determining the respective strength value for each range bin based on changes of the respective I and Q signals over the plurality of frames includes determining the respective strength values for each range bin based on changes of the respective I and Q signals corresponding to a first chirp of each of the plurality of frames.

Example 7. The method of one of examples 1 to 6, where determining the respective strength values for each range bin based on changes of the respective I and Q signals corresponding to the first chirp of each of the plurality of frames includes determining the respective strength values for each range bin based on $$\sum_{w=1}^{W-1} |R_{r,1,w+1} - R_{r,1,w}|,$$

where W represents a number of frames, $R_{r,1,w+1}$ represents a value of range bin $R_r$ for chirp 1 of frame w+1, and $R_{r,1,w}$ represents a value of range bin $R_r$ for chirp 1 of frame w.

Example 8. The method of one of examples 1 to 7, where each of the plurality of frames includes only a single chirp, the method further including: determining a velocity of the target; and associating a peak to the target when the determined velocity is higher than a predetermined velocity threshold.

Example 9. The method of one of examples 1 to 8, further including: assigning a state to the target; and updating the state based on a previous state and on the identified peak range bin.

Example 10. The method of one of examples 1 to 9, further including: identifying a second peak range bin based on the performed peak search; associating a second target to the second peak range bin; assigning a second state to the second target; and updated the second state based on a previous second state and on the identified second peak range bin.

Example 11. The method of one of examples 1 to 10, where assigning the state to the target includes assigning the state to the target from a set of states, where the set of states includes an unsure state, a moving state indicative of target movement, and a static state indicative of lack of target movement.

Example 12. The method of one of examples 1 to 11, further including tracking the target with a track, where the track is activated when the target transitions into the moving state, and where the target transitions into the static state only if the track is activated.

Example 13. The method of one of examples 1 to 12, further including: tracking the target with a track; and killing the track when a timer expires and the target is in the unsure state.

Example 14. The method of one of examples 1 to 13, where associating the target to the identified peak range bin including creating a track and transitioning the target into the unsure state.

Example 15. The method of one of examples 1 to 14, further including: determining a range of the target based on the identified peak range bin; and determining a velocity of the target based on the determined range.

Example 16. The method of one of examples 1 to 15, where determining the velocity of the target includes performing the derivative of the range of the target.

Example 17. The method of one of examples 1 to 16, further including transmitting radar signals with the millimeter-wave radar, where the reflected radar signals are based on the transmitted radar signals, and where the transmitted radar signals include linear chirps.

Example 18. The method of one of examples 1 to 17, where the target is a human target.

Example 19. A device including: a millimeter-wave radar configured to transmit chirps and receive reflected chirps; and a processor configured to: perform a range discrete Fourier Transform (DFT) based on the reflected chirps to generate in-phase (I) and quadrature (Q) signals for each range bin of a plurality of range bins, for each range bin of the plurality of range bins, determine a respective strength value based on changes of respective I and Q signals over time, perform a peak search across the plurality of range bins based on the respective strength values of each of the plurality of range bins to identify a peak range bin, and associate a target to the identified peak range bin.

Example 20. A method including: receiving reflected radar signals with a millimeter-wave radar; performing a range Fast Fourier Transform (FFT) based on the reflected radar signals to generate in-phase (I) and quadrature (Q) signals for each range bin of a plurality of range bins; for each range bin of the plurality of range bins, determining a respective short term movement value based on changes of respective I and Q signals in a single frame; performing a peak search across the plurality of range bins based on the respective short term movement values of each of the plurality of range bins to identify a short term peak range bin; and associating a target to the identified short term peak range bin.

Example 21. The method of example 20, further including: for each range bin of the plurality of range bins, determining a respective long term movement value based on changes of respective I and Q signals over a plurality of frames; performing a peak search across the plurality of range bins based on the respective long term movement values of each of the plurality of range bins to identify a long term peak range bin; and associating the identified long term peak range bin to the target.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving reflected radar signals with a millimeter-wave radar;
   performing a range discrete Fourier Transform (DFT) based on the reflected radar signals to generate in-phase (I) and quadrature (Q) signals for each range bin of a plurality of range bins;
   for each range bin of the plurality of range bins,
     determining a respective short-term movement (STM) strength value based on changes of respective I and Q signals over a single frame, and
     determining a respective long-term movement (LTM) strength value based on changes of respective I and Q signals over a plurality of frames;
   performing a peak search across the plurality of range bins based on the respective STM strength values of each of the plurality of range bins to identify a peak STM range bin;
   performing a peak search across the plurality of range bins based on the respective LTM strength values of each of the plurality of range bins to identify a peak LTM range bin;
   associating a target to an identified peak range bin, wherein the identified peak range bin corresponds to the peak STM range bin or to the peak LTM range bin; and
   assigning a state to the target from a set of states, wherein the set of states comprises a moving state indicative of movement of the target, a static state indicative of lack of movement of the target, and an unsure state indicative of a state different from the static state and the moving state, wherein, when the target is in the unsure state, the target transitions from the unsure state to the moving state when the identified peak range bin corresponds to the peak STM range bin, and the target transitions from the unsure state to the static state when the identified peak range bin corresponds to the peak LTM range bin and does not correspond to the peak STM range bin.

2. The method of claim 1, wherein the target never transitions directly from the moving state to the static state.

3. The method of claim 1, wherein determining the respective STM strength values for each range bin based on changes of the respective I and Q signals over the single frame comprises determining the respective STM strength values for each range bin based on $$\sum_{c=1}^{PN-1} |R_{r,c+1} - R_{r,c}|$$

wherein PN represents a number of chirps per frame, $R_{r,c+1}$ represents a value of range bin $R_r$ for chirp c+1, and $R_{r,c}$ represents a value of range bin $R_r$ for chirp c.

4. The method of claim 1, wherein the target never transitions directly from the static state to the moving state.

5. The method of claim 1, wherein determining the respective LTM strength values for each range bin based on changes of the respective I and Q signals over the plurality of frames comprises determining the respective LTM strength values for each range bin based on $$\sum_{w=1}^{W-1} |R_{r,i,w+1} - R_{r,i,w}|$$

wherein W represents a number of frames, $R_{r,i,w+1}$ represents a value of range bin $R_r$ for chirp i of frame w+1, and $R_{r,i,w}$ represents a value of range bin $R_r$ for chirp i of frame w.

6. The method of claim 1, wherein determining the respective STM or LTM strength value for each range bin based on changes of the respective I and Q signals over the plurality of frames comprises determining the respective strength values for each range bin based on changes of the respective I and Q signals corresponding to a first chirp of each of the plurality of frames.

7. The method of claim 6, wherein determining the respective STM or LTM strength values for each range bin based on changes of the respective I and Q signals corresponding to the first chirp of each of the plurality of frames comprises determining the respective STM or LTM strength values for each range bin based on $$\sum_{\omega=1}^{W-1} |R_{r,1,\omega+1} - R_{r,1,\omega}|$$

wherein W represents a number of frames, $R_{r,1,w+1}$ represents a value of range bin $R_r$ for chirp 1 of frame w+1, and $R_{r,1,w}$ represents a value of range bin $R_r$ for chirp 1 of frame w.

8. The method of claim 6, wherein each of the plurality of frames comprises at most a single chirp, the method further comprising:
determining a velocity of the target; and
associating a peak to the target when the determined velocity is higher than a predetermined velocity threshold.

9. The method of claim 1, further comprising:
tracking the target with a track;
setting a timer to a predetermined count when the target transitions from the unsure state to the static state; and
killing the track when the timer expires and the target is in the static state.

10. The method of claim 1, further comprising:
identifying a second peak range bin based on the performed peak search across the plurality of range bins based on the respective LTM strength values of each of the plurality of range bins;
associating a second target to the second peak range bin;
assigning a second state to the second target; and
updated the second state based on a previous second state and on the identified second peak range bin.

11. The method of claim 1, further comprising tracking the target with a track, wherein the track is activated when the target transitions into from the unsure state to the moving state, and wherein the target transitions into the static state only if the track is activated.

12. The method of claim 1, further comprising:
tracking the target with a track; and
killing the track when a timer expires and the target is in the unsure state.

13. The method of claim 1, wherein associating the target to the identified peak range bin comprises creating a track and transitioning the target into the unsure state.

14. The method of claim 1, further comprising:
determining a range of the target based on the identified peak range bin; and
determining a velocity of the target based on the determined range.

15. The method of claim 14, wherein determining the velocity of the target comprises determining a derivative of the range of the target.

16. The method of claim 1, further comprising transmitting radar signals with the millimeter-wave radar, wherein the reflected radar signals are based on the transmitted radar signals, and wherein the transmitted radar signals comprise linear chirps.

17. The method of claim 1, wherein the target is a human target.

18. The method of claim 1, further comprising:
tracking the target with a track; and
estimating a range of the target by $$R_{est} = \alpha \cdot R_{meas} + (1-\alpha) \cdot R_{pred},$$

wherein $R_{est}$ represents the estimated range of the target, Rmeas represents a measured range and is based on the identified peak range bin, Rpred represents a predicted range based on the track, and $\alpha$ is a number between 0 and 1, inclusive.

19. The method of claim 18, further comprising:
setting $\alpha$ to a first value when the target transitions from the unsure state to the moving state; and
setting $\alpha$ to a second value when the target transitions from the unsure state to the static state, wherein the second value is lower than the first value.

20. The method of claim 19, further comprising setting $\alpha$ to a third value when the target transitions from the moving state to the unsure state, wherein the third value is lower than the first value.

21. A device comprising:
a millimeter-wave radar configured to transmit chirps and receive reflected chirps; and
a processor configured to:
perform a range discrete Fourier Transform (DFT) based on the reflected chirps to generate in-phase (I) and quadrature (Q) signals for each range bin of a plurality of range bins,
for each range bin of the plurality of range bins,
determine a respective short-term movement (STM) strength value based on changes of respective I and Q signals over a single frame, and
determine a respective long-term movement (LTM) strength value based on changes of respective I and Q signals over a plurality of frames,
perform a peak search across the plurality of range bins based on the respective STM strength values of each of the plurality of range bins to identify a peak STM range bin,
perform a peak search across the plurality of range bins based on the respective LTM strength values of each of the plurality of range bins to identify a peak LTM range bin, associate a target to the identified peak range bin, wherein the identified peak range bin corresponds to the peak STM range bin or to the peak LTM range bin, and assign a state to the target from a set of states, wherein the set of states comprises a moving state indicative of movement of the target, a static state indicative of lack of movement of the target, and an unsure state indicative of a state different from the static state and the moving state, wherein, when the target is in the unsure state, the target transitions from the unsure state to the moving state when the identified peak range bin corresponds to the peak STM range bin, and the target transitions from the unsure state to the static state when the identified peak range bin corresponds to the peak LTM range bin and does not correspond to the peak STM range bin.

22. A method comprising:

receiving reflected radar signals with a millimeter-wave radar;

performing a range Fast Fourier Transform (FFT) based on the reflected radar signals to generate in-phase (I) and quadrature (Q) signals for each range bin of a plurality of range bins;

for each range bin of the plurality of range bins,
  determining a respective short term movement value based on changes of respective I and Q signals in a single frame, and
  determining a respective long term movement value based on changes of respective I and Q signals over a plurality of frames;

performing a peak search across the plurality of range bins based on the respective short term movement values of each of the plurality of range bins to identify a short term peak range bin;

performing a peak search across the plurality of range bins based on the respective long term movement values of each of the plurality of range bins to identify a long term peak range bin; and associating a target to an identified peak range bin, wherein the identified peak range bin corresponds to the short term peak range bin or to the long term peak range bin; and assigning a state to the target from a set of states, wherein the set of states comprises a moving state indicative of movement of the target, a static state indicative of lack of movement of the target, and an unsure state indicative of a state different from the static state and the moving state, wherein, when the target is in the unsure state, the target transitions from the unsure state to the moving state when the identified peak range bin corresponds to the short term peak range bin, and the target transitions from the unsure state to the static state when the identified peak range bin corresponds to the long term peak range bin and does not correspond to the short term peak range bin.

* * * * *